(12) United States Patent
Doi et al.

(10) Patent No.: US 8,498,282 B2
(45) Date of Patent: Jul. 30, 2013

(54) RADIO COMMUNICATION METHOD AND RADIO COMMUNICATION DEVICE

(75) Inventors: Hiroshi Doi, Osaka (JP); Taisuke Matsumoto, Sunnyvale, CA (US); Kazuaki Takahashi, Tokyo (JP); Suguru Fujita, Tokyo (JP)

(73) Assignee: Panasonic Corporation, Osaka (JP)

( * ) Notice: Subject to any disclaimer, the term of this patent is extended or adjusted under 35 U.S.C. 154(b) by 978 days.

(21) Appl. No.: 12/522,272

(22) PCT Filed: Jan. 18, 2008

(86) PCT No.: PCT/JP2008/050643
§ 371 (c)(1),
(2), (4) Date: Jul. 7, 2009

(87) PCT Pub. No.: WO2008/088052
PCT Pub. Date: Jul. 24, 2008

(65) Prior Publication Data
US 2010/0002676 A1    Jan. 7, 2010

(30) Foreign Application Priority Data

Jan. 19, 2007  (JP) .................................. 2007-010818
Jan. 17, 2008  (JP) .................................. 2008-008142

(51) Int. Cl.
*H04J 3/00*  (2006.01)
*H04B 7/00*  (2006.01)

(52) U.S. Cl.
USPC ............................. 370/345; 370/310; 370/498

(58) Field of Classification Search
USPC ........................................................ 370/345
See application file for complete search history.

(56) References Cited

U.S. PATENT DOCUMENTS

| 2002/0044549 | A1* | 4/2002 | Johansson et al. ............. 370/386 |
| 2003/0152059 | A1* | 8/2003 | Odman ........................ 370/338 |
| 2003/0169697 | A1* | 9/2003 | Suzuki et al. ................. 370/310 |
| 2003/0179721 | A1* | 9/2003 | Shurmantine et al. ........ 370/315 |
| 2005/0152381 | A1  | 7/2005 | Kim |
| 2005/0163042 | A1  | 7/2005 | Roberts |
| 2009/0160707 | A1* | 6/2009 | Lakkis ......................... 342/367 |
| 2011/0044338 | A1* | 2/2011 | Stahl et al. ................... 370/392 |

FOREIGN PATENT DOCUMENTS

| JP | 2003-143644 A | 5/2003 |
| JP | 2005-204319 A | 7/2005 |
| JP | 2005-260921 A | 9/2005 |
| JP | 2006-173946 A | 6/2006 |

OTHER PUBLICATIONS

Sekido et al., "Smart Antena o Mochiiru Ad Hoc Network MAC Protocol no Shikosei Kakure Tanmatsu Mondai to Sono Kaiketsuho," Transactions of Information Processing Society of Japan, Sep. 15, 2005, vol. 46, No. 9, pp. 2226-2235.

(Continued)

*Primary Examiner* — Shripal Khajuria
(74) *Attorney, Agent, or Firm* — Greenblum & Bernstein, P.L.C.

(57) ABSTRACT

A radio communication method is capable of easily realizing multi-access in an ad-hoc network using a directive radio wave. In the ad-hoc network using the directive radio wave of the method, two PNC functioning as master devices are arranged opposed to each other so that their directivities face to each other. A super frame is time-divided into two sub super frames so that one of the sub super frames is controlled by one of the PNC and the other sub super frame is controlled by the other PNC.

18 Claims, 26 Drawing Sheets

OTHER PUBLICATIONS

"Local and metropolitan area networks—Part 11: Wireless LAN Medium Access Control (MAC) and Physical Layer (PHY) Specifications," ANS/IEEE Standard 802.11, 1999 Edition.

"Local and metropolitan area networks—Part 15.3: Wireless Medium Access Control (MAC) and Physical Layer (PHY) Specifications for High Rate Wireless Personal Area Networks (WPAN's)," IEEE Standard 802.15.3, 2003.

* cited by examiner

FIG.7A BEACON

| HEADER | PNC INFORMATION | PRIMARY-SIDE TERMINAL INFORMATION | SECONDARY-SIDE TERMINAL INFORMATION | RS INFORMATION | FEC |

FIG.7B RS RESERVATION

| HEADER | PICONET ID | FLAG-1 | TRANSMISSION SOURCE ADDRESS | TRANSMISSION DESTINATION ADDRESS | RS INFORMATION | FEC |

FIG.7C RS RESET (RSR)

| HEADER | PICONET ID | FLAG-1 | TRANSMISSION SOURCE ADDRESS | TRANSMISSION DESTINATION ADDRESS | RS INFORMATION | FEC |

FIG.7D ASSOCIATION

| HEADER | PICONET ID | FLAG-2 | REQUESTER | AUTHENTICATION INFORMATION | FEC |

FIG.7E KEEP-ALIVE

| HEADER | PICONET ID | FLAG-3 | TRANSMISSION SOURCE ADDRESS | NEXT TRANSMISSION TIME | FEC |

FIG.7F DATA

| HEADER | DATA | FEC |

FIG.18G BEACON

| HEADER | PNC INFORMATION | SELF-SIDE TERMINAL INFORMATION | UPPER-SIDE TERMINAL INFORMATION | LOWER-SIDE TERMINAL INFORMATION | RS INFORMATION | FEC |

FIG.18H PNC PAIRING REQUEST

| HEADER | PICONET ID | FLAG-4 | AUTHENTICATION CODE | SUBSUPERFRAME LENGTH | FEC |

FIG.18I SUBSUPERFRAME MOVE REQUEST

| HEADER | FLAG-5 | MOVEMENT WIDTH | FEC |

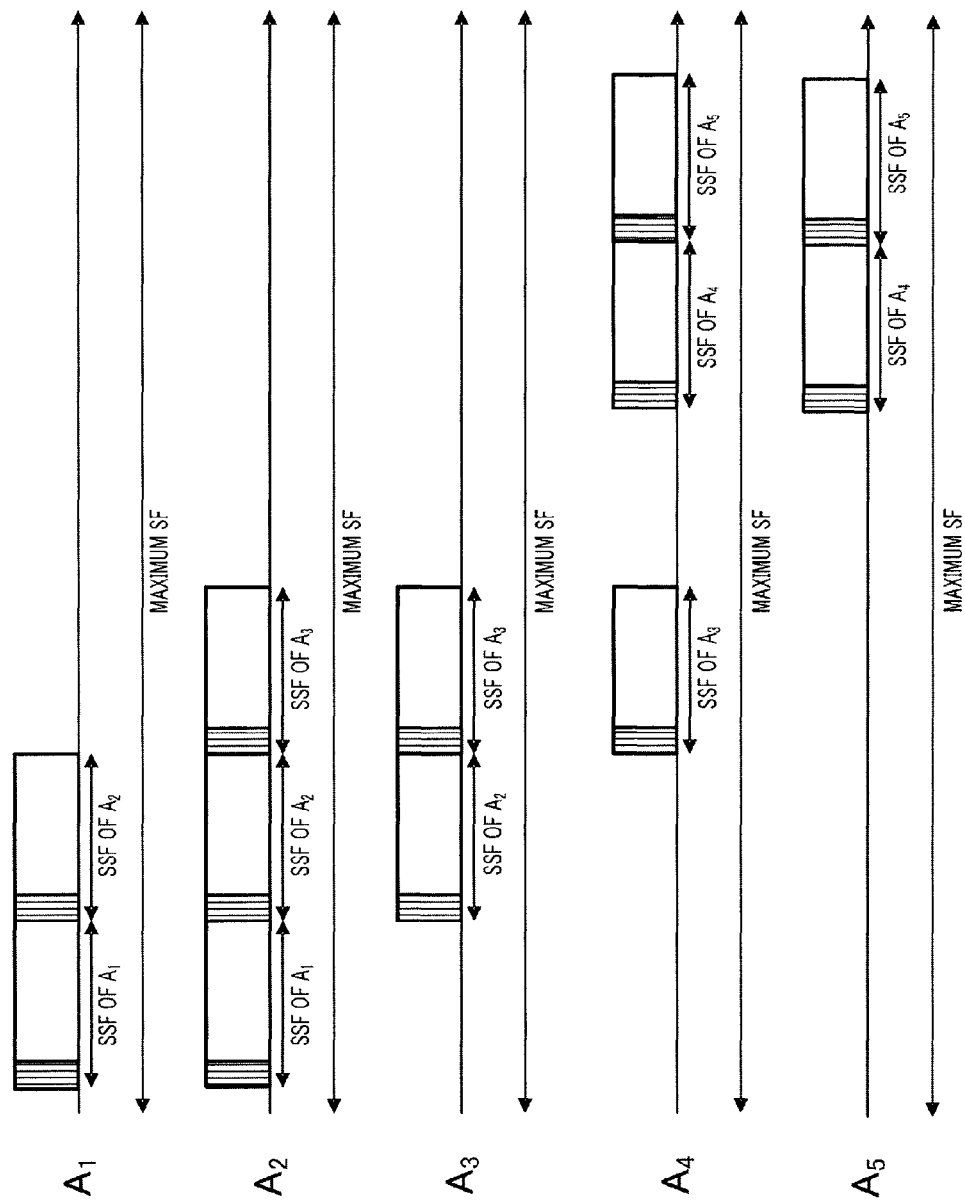

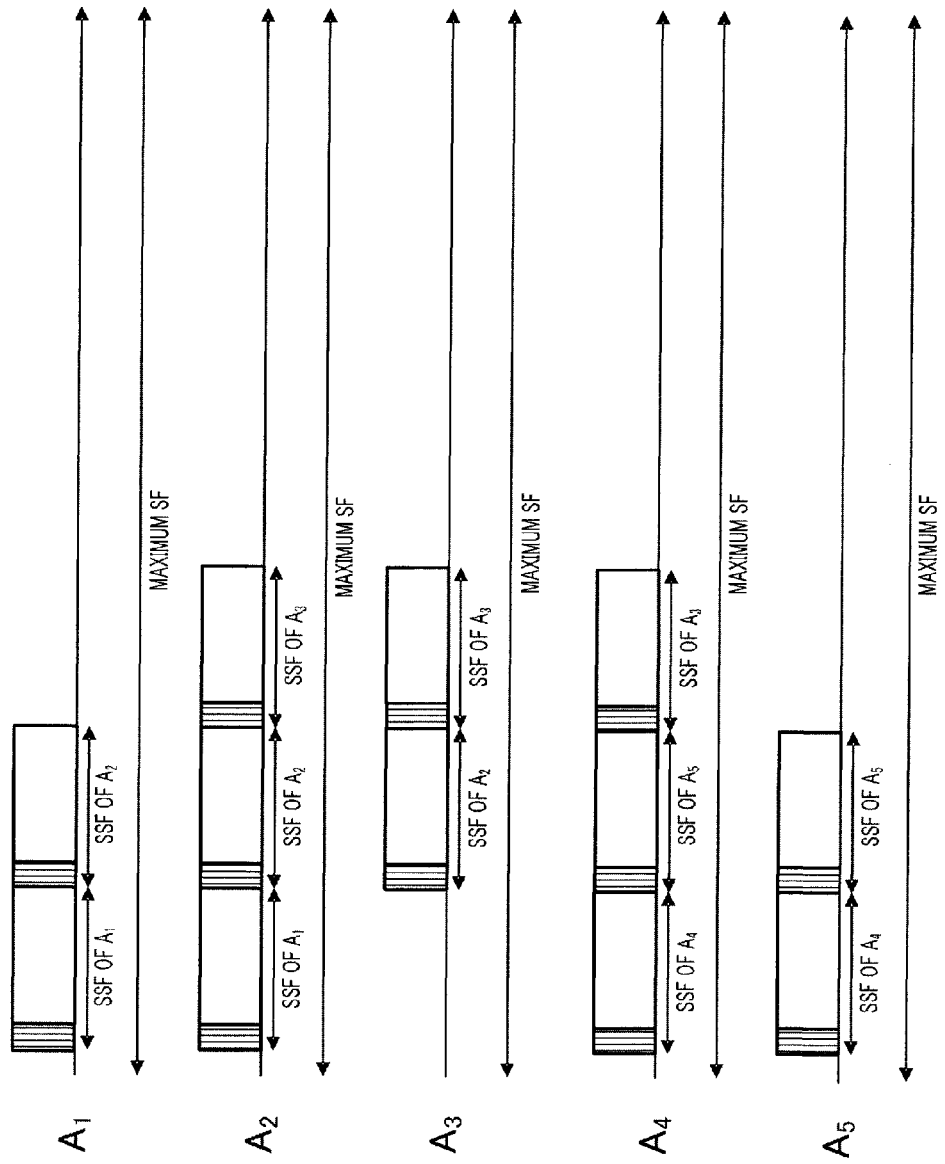

RADIO COMMUNICATION METHOD AND RADIO COMMUNICATION DEVICE

TECHNICAL FIELD

The present invention relates to a wireless communication method and wireless communication apparatus that are suitable to build a wireless communication network, particularly, a multiaccess adhoc network.

BACKGROUND ART

UWB (Ultra Wide Band) refers to short-distance wireless communication techniques that are being developed in recent years. The UWB technology for the microwave band has been standardized by WiMedia, which is an industry organization of UWB, and products (for example, wireless USB's) conforming to the UWB technology will be released in near future.

The multiaccess technology is introduced in wireless communication of comparatively short distance communication such as UWB and Wi-Fi (Wireless Fidelity) in terms of necessity to effectively utilize bands. Wi-Fi realizes multiaccess by means of exclusive control based on a carrier detecting function according to CSMA/CA (Carrier Sense Multiple Access with Collision Avoidance) which is a wireless version of the CSMA/CD (Carrier Sense Multiple Access with Collision Detection) protocol of Ethernet (registered trademark). Characteristics of Wi-Fi include employing a star formed network that mediates access points. Further, Non-Patent Document 1 discloses the Wi-Fi technique.

Further, WiMedia realizes multiaccess by means of slot reservation type exclusive control based primarily on TDMA (Time Division Multiple Access). Furthermore, the network form according to Wi-Media is a mesh type that configures the network in which each node transmits a beacon from one another.

Specific characteristics of radio waves in the millimeter wave band include directivity. That is, radio waves in the millimeter wave band have directivity, which is different from radio waves in the micro wave band. There is a demand that multiaccess is realized in wireless communication schemes using UWB for the millimeter wave band, that is, wireless communication schemes using directional radio waves.

The transmission distance in UWB is extremely short, and, therefore, a UWB application is, for example, WPAN (Wireless Personal Area Network). PAN is a network technique for connecting, in the wide band, devices owned by individuals, and WPAN is assumed to connect digital household appliances by radio. Non-Patent Document 2 discloses the current configuration of MAC (Medium Access Control) in WPAN.
Non-Patent Document 1: "Local and metropolitan area networks—Part 11: Wireless LAN Medium Access Control (MAC) and Physical Layer (PHY) Specifications," ANS/IEEE Standard 802.11, 1999 Edition
Non-Patent Document 2: "Local and metropolitan area networks—Part 15.3: Wireless Medium Access Control (MAC) and Physical Layer (PHY) Specifications for High Rate Wireless Personal Area Networks (WPAN's)," IEEE Standard 802.15.3-2003

DISCLOSURE OF INVENTION

Problems to be Solved by the Invention

To study methods for realizing multiaccess in wireless communication schemes using UWB for the millimeter band, it is necessary to examine what network form can be adopted. With the above WPAN, which is regarded as the UWB application, its components are referred to as "devices (DEV's)," and, consequently, nodes configuring the network will be referred to as "devices (DEV's)" in the present specification.

First, there is the fact that, with the UWB technology for the millimeter band, millimeter waves have strong directivities and therefore it is difficult to use exclusive control according to CSMA. For example, as shown in FIG. 1, when device P wants to communicate with device Q, the competing party is device X. At this time, both device P and device X perform communication through directional antennas and, therefore, it is difficult for device P and device X to receive signals from device X and device P, respectively. Therefore, with UWB for the millimeter band, it is difficult to apply the CSMA technique that carries out exclusive control by deciding whether or not there is a carrier.

Further, in the star formed network configuration, it is difficult to realize multiaccess in bi-directional communication. The reason is as follows. As shown in FIG. 2, one device P (i.e. master) forms a wireless communication area by means of directional radio and a plurality of other devices Q1 and Q2 (i.e. slaves) in this wireless communication area are oriented toward the same direction and, consequently, exclusive control of communication from these plurality of devices Q1 and Q2 (i.e. slaves) to device P (i.e. master) may be configurable. However, it is difficult to carry out exclusive control of communication by device (i.e. master) P.

It is therefore an object of the present invention to provide a wireless communication method and wireless communication apparatus that can realize multiaccess easily in an adhoc network using directional radio waves.

Means for Solving the Problem

A wireless communication method according to the present invention whereby a plurality of master wireless communication apparatuses, which control at least one slave wireless communication apparatus in a communication area using a directional radio wave, perform communication using a superframe, includes: arranging the master wireless communication apparatuses such that directivities of the master wireless communication apparatuses face each other; and controlling communication by dividing the superframe into subsuperframes in a time domain and assigning the respective subsuperframes between the master wireless communication apparatuses.

A wireless communication apparatus according to the present invention that performs wireless communication using a directional radio wave, employs a configuration including: a medium access control (MAC) processing section that, using one subsuperframe acquired by dividing a superframe used in network communication, into subsuperframes in a time domain, generates a main beacon that is a reference signal for synchronization transmitted to another master wireless communication apparatus arranged such that directivities of the master wireless communication apparatus and the another master wireless communication apparatus face each other; and a transmitting section that transmits the generated main beacon.

A wireless communication apparatus according to the present invention that performs wireless communication using a directional radio wave, employs a configuration including: a receiving section that, from another master wireless communication apparatus arranged such that directivities of the master wireless communication apparatus and the another master wireless communication apparatuses face each other, receives a main beacon that is a reference signal for synchronization transmitted using one subsuperframe acquired by dividing a superframe used in network communication, into subsuperframes in a time domain; a medium access control (MAC) processing section that generates an echo beacon including information showing that the beacon is an echo of the main beacon; and a transmitting section that transmits the generated echo beacon.

Advantageous Effect of the Invention

According to the present invention, it is possible to realize multiaccess easily in an adhoc network using directional radio waves.

BRIEF DESCRIPTION OF DRAWINGS

FIG. 7A shows a beacon frame format;

FIG. 7B shows a RS reservation frame format;

FIG. 7C shows an RS reset (RSR: Reservation Slot Reset) frame format;

FIG. 7D shows an association frame format;

FIG. 7E shows a keep-alive frame format;

FIG. 7F shows a data frame format;

FIG. 18G shows a beacon frame format;

FIG. 18H shows a PNC pairing request frame format;

FIG. 18I shows a subsuperframe move request frame format;

FIG. 19 shows an example of transmitting and receiving subsuperframes in the superframe according to Embodiment 2;

FIG. 20 shows an example of transmitting and receiving subsuperframes in the superframe according to Embodiment 2;

BEST MODE FOR CARRYING OUT THE INVENTION

Embodiment 1

Hereinafter, Embodiment 1 of the present invention will be explained with reference to the accompanying drawings. Further, although a case will be explained below where a wireless communication apparatus performs wireless communication using UWB for the millimeter band, the present invention is not limited to this. Further, with the present embodiment, assuming application of the present embodiment to WPAN, terms used for WPAN are used. To be more specific, nodes (i.e. terminals) configuring a network will be generally referred to as "devices." Further, a governing device (i.e. master) among a plurality of devices configuring the network will be referred to as a "piconet coordinator." Particularly, a master device will be referred to as a "PNC" and a slave device will be referred to as a "DEV." Assume that devices are digital household appliances, to be more specific, such as televisions, HDD recorders, digital still cameras, video cameras and audio players.

Figure 1:
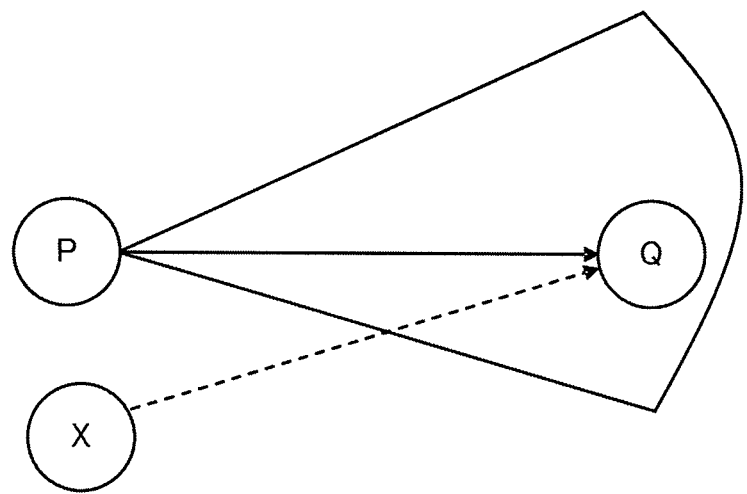
FIG. 1 illustrates difficulty in exclusive control according to CSMA.
Figure 2:
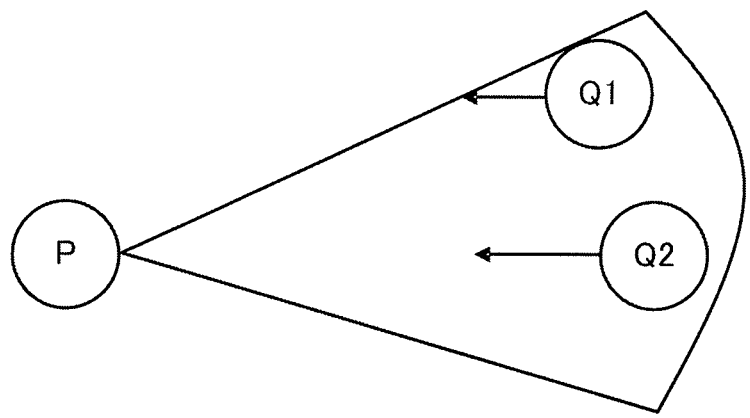
FIG. 2 illustrates difficulty in exclusive control according to a star formed network configuration.
Figure 3:
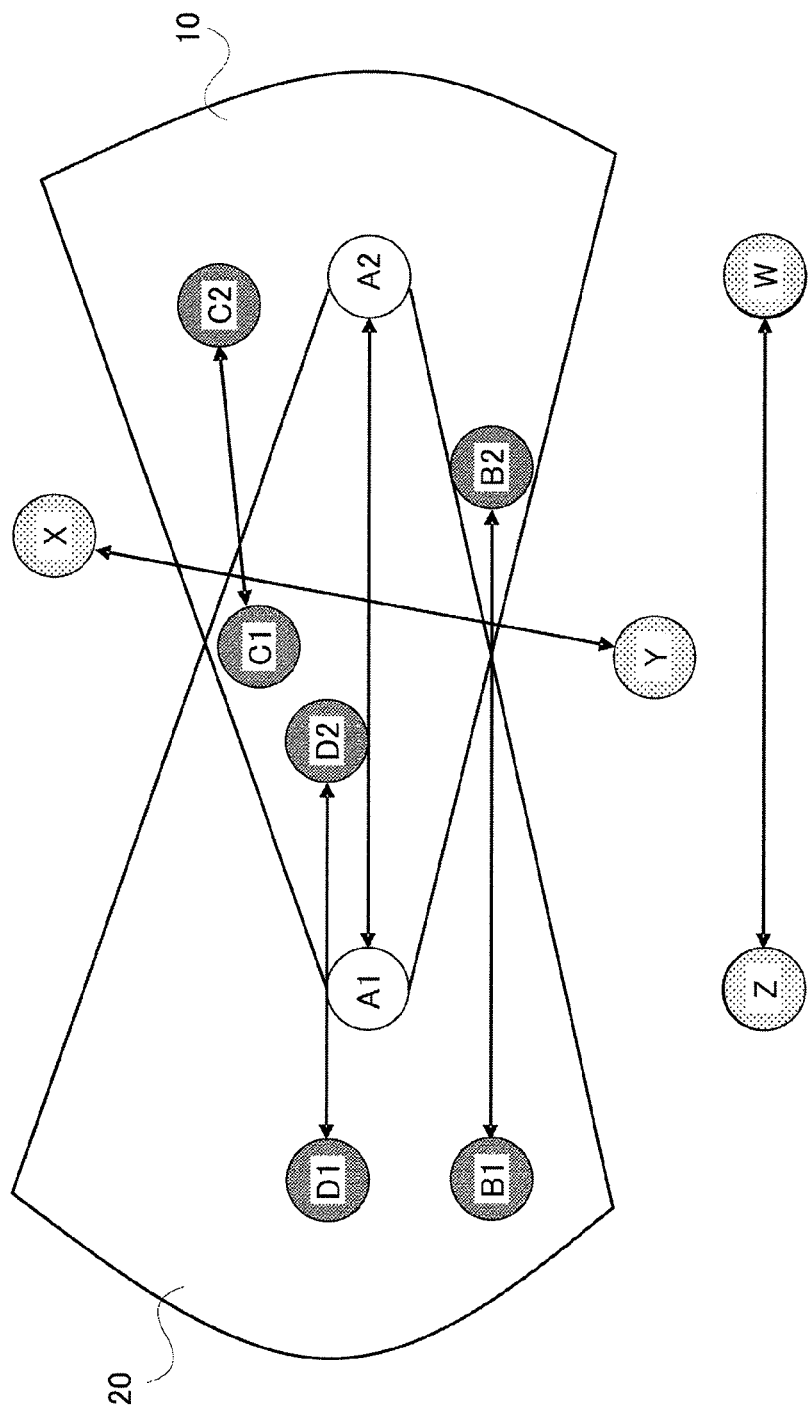
FIG. 3 is a schematic view showing a network configuration to which a wireless communication method according to the present embodiment is applied.

FIG. 3 is a schematic view showing a network configuration to which a wireless communication method according to the present embodiment is applied.

FIG. 3 shows an example of a network with two PNC's (A1 and A2). Each PNC serves as a master device and forms one piconet by grouping a plurality of other neighboring slave devices (DEV's). A piconet is a network configured by connecting a plurality of slave devices with respect to one master device. A PNC has a function of adjusting timings in a network by transmitting beacons (i.e. reference signals). A DEV is subject to a network and receives a beacon to communicate (for example, transmit and receive data) with a communicating party at a timing designated by a PNC. A PNC controls formation of communication paths for DEV's by managing time resources (for example, time intervals) assigned to DEV's. By this means, one-to-one (i.e. point-to-point) communication paths are formed between arbitrary DEV's, so that communication such as data transfer is performed. Further, a PNC also functions simply as a DEV in a piconet. That is, a PNC can transmit and receive data if necessary.

Two PNC's (A1 and A2) use directional radio waves (i.e. UWB for the millimeter band) and each have certain wireless communication areas 10 and 20. Two PNC's (A1 and A2) are arranged to face each other such that their directivities face each other, that is, one wireless communication apparatus is located in the wireless communication area of the other PNC. With the present embodiment, preferably, two PNC's (A1 and A2) provide one directional antenna in their wireless communication apparatuses in a fixed arrangement in a specific direction. When the application the present invention to WPAN is taken into account, PNC's are stationary digital household appliances such as digital television receivers. Further, PNC's may be mobile terminals such as mobile telephones and PDA's (Personal Data Assistances). Moreover, although not shown, each DEV has directivity.

For example, in FIG. 3, in wireless communication area 10 of one PNC (A1), there are the other PNC (A2) and a plurality of DEV's (B2, C2 and D2). There are one PNC (A1) and a plurality of DEV's (B1, C1 and D1) in wireless communication area 20 of the other PNC (A2). Accordingly, in the network in FIG. 3, one PNC (A1) forms a sub-piconet including three DEV's (B2, C2 and D2) and the other PNC (A2) forms another sub-piconet including other three DEV's (B1, C1 and D1). That is, with the network in FIG. 3, two PNC's (A1 and A2) each form a sub-piconet and, further, these two sub-piconets configure one piconet. Further, devices X, Y and Z are outside this network in FIG. 3.

As described later in detail, two PNC's (A1 and A2) acquire synchronization and transmit beacons. Therefore, with the present embodiment, two PNC's are distinguished as the "primary" PNC and the "secondary" PNC. The primary-side PNC is a device that can communicate with the secondary-side DEV's and the secondary-side PNC is a device that can communicate with the primary-side DEV's. For example, in FIG. 3, when A1 is the "primary" PNC and A2 is the "secondary" PNC, device A1 is the primary-side PNC and device A2 is the secondary-side PNC. Further, devices B1, C1 and D1 are the primary-side DEV's that can communicate with the secondary-side PNC (A2) and devices B2, C2 and D2 are the secondary-side DEV's that can communicate with the primary-side PNC (A1). Furthermore, which PNC is designated as the "primary" PNC (or "secondary" PNC) is determined based on setting information.

Figure 4:
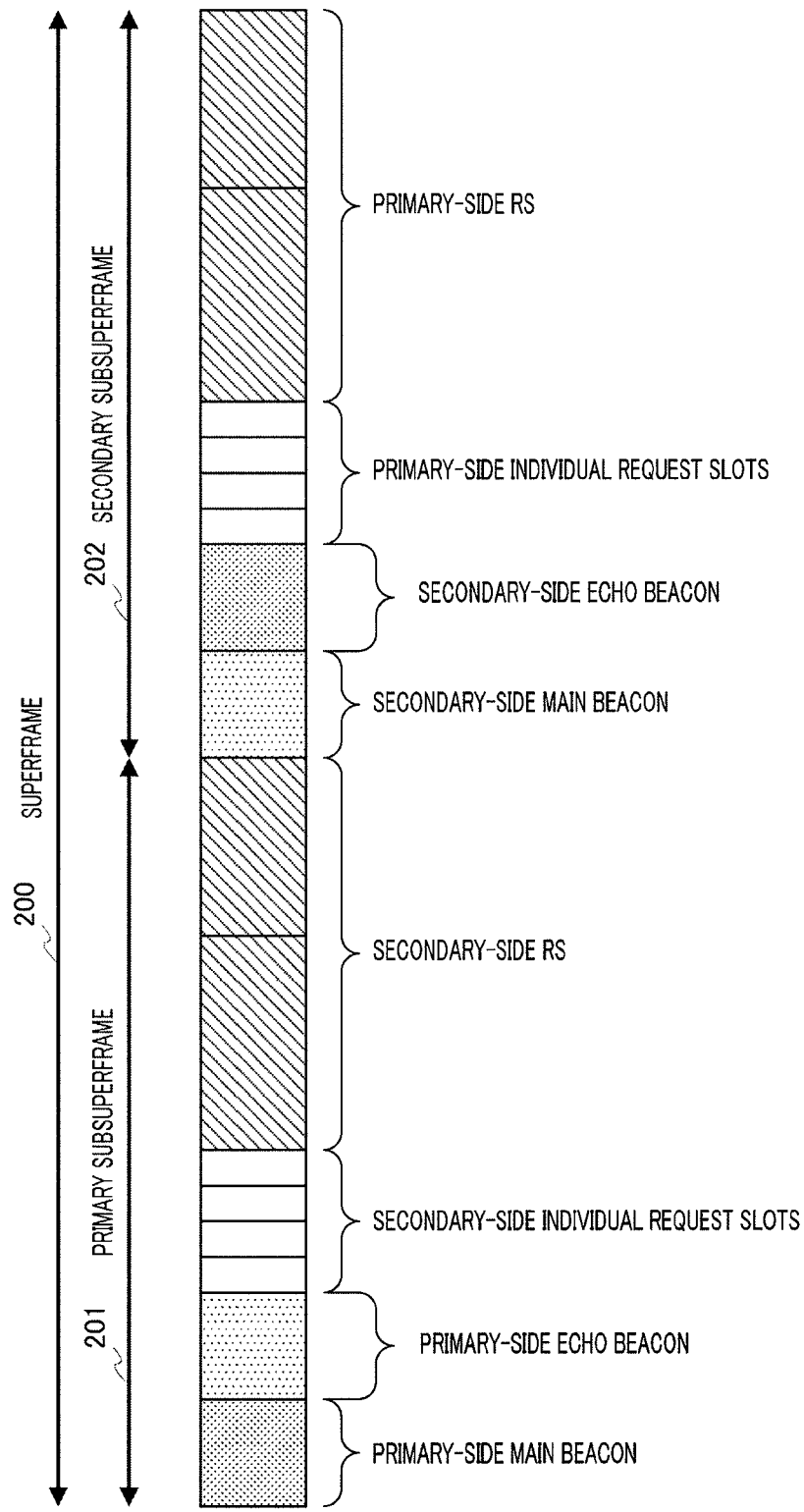
FIG. 4 shows a configuration of a maximum superframe in the network in FIG. 3.

FIG. 4 shows a configuration of a superframe in the network in FIG. 3. Further, FIG. 5 shows the relationship between transmission and reception of signals between devices in the superframe in FIG. 4.

Network communication according to the present embodiment uses the superframe having the configuration shown in FIG. 4. This superframe 200 is configured with two subsuperframes, to be more specific, primary subsuperframe 201 and secondary subsuperframe 202. Primary subsuperframe 201 is a superframe for transmitting a main beacon from the primary-side PNC. Primary subsuperframe 201 is configured with, from its head, four portions including a primary-side main beacon, a primary-side echo beacon, secondary-side individual request slots and secondary-side RS (Reservation Slot). Further, secondary subsuperframe 202 is a superframe for transmitting a main beacon from the secondary-side PNC and is configured with the same portions as in primary subsuperframe 201. That is, secondary subsuperframe 202 is configured with, from its head, a secondary-side main beacon, a secondary-side echo beacon, primary-side individual request slots and a primary-side RS.

Figure 5:
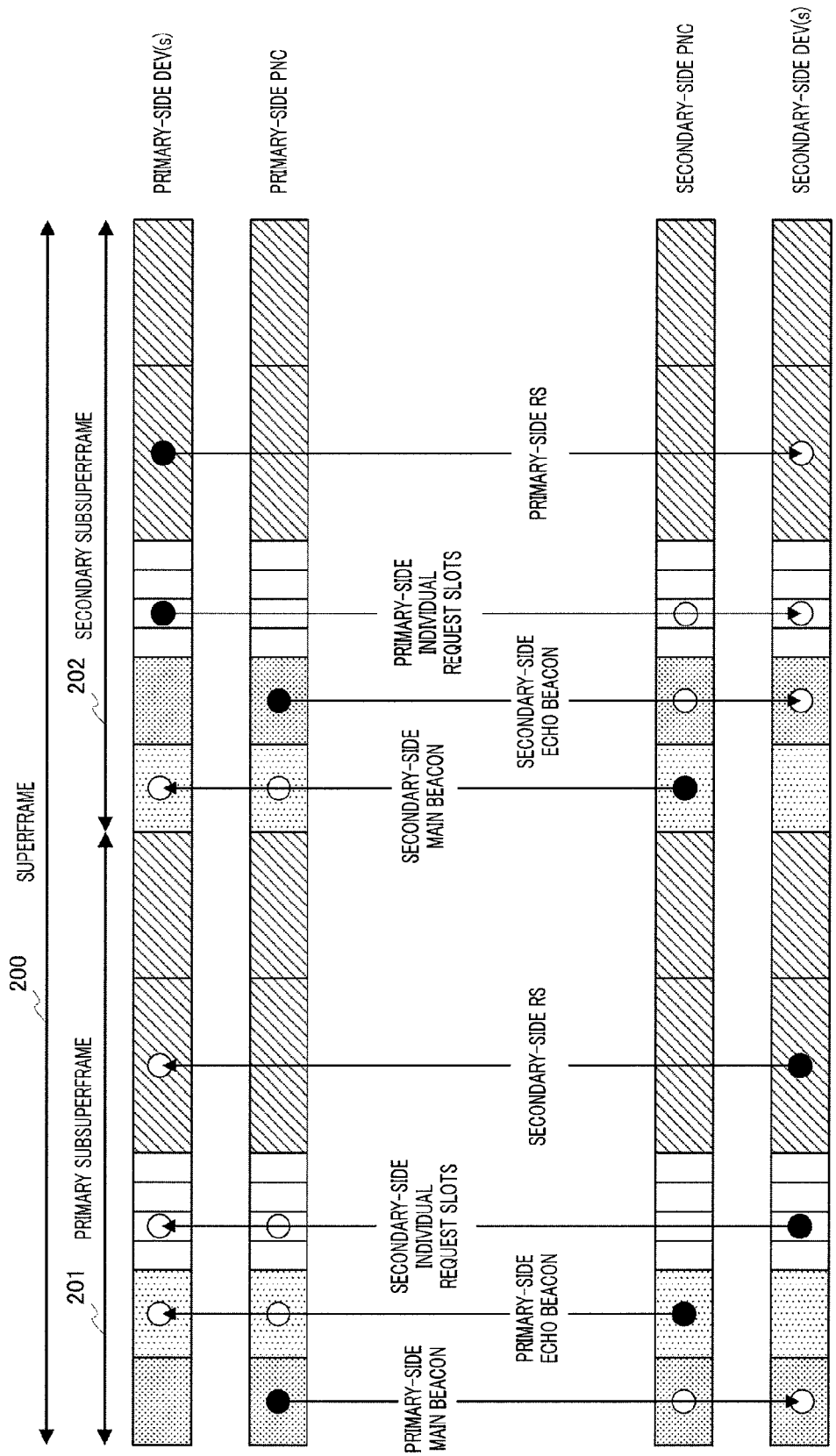
FIG. 5 shows the relationship between transmission and reception of signals between devices in the maximum superframe in FIG. 4.

As shown in FIG. 5, the primary-side main beacon is transmitted from the primary-side PNC to the secondary-side devices (i.e. PNC and DEV's). The primary-side main beacon is a control signal for acquiring synchronization of a timing to start a primary subsuperframe between all secondary-side devices (i.e. PNC and DEV's) and for communicating necessary information and commands to the secondary-side devices at the same time. The beacon is transmitted by broadcasting.

As shown in FIG. 5, the primary-side echo beacon is transmitted (broadcasted) from the secondary-side PNC to the primary-side devices (i.e. PNC and DEV's). This primary-side echo beacon is a control signal for reporting to the primary-side DEV's the details of the primary-side main beacon transmitted from the primary-side PNC to the secondary-side devices (i.e. PNC and DEV's). The details of the primary-side echo beacon are the same as the primary-side main beacon except for a transmission source address and an echo flag in a frame header. By this means, the primary-side DEV's that originally have difficulty in receiving the primary-side main beacon can learn the details of the primary-side main beacon, so that the primary-side devices (i.e. PNC and DEV's) that have difficulty in communicating with each other can share information.

The secondary-side individual request slots are slots for making various requests from the secondary-side DEV's to the network as access periods where all secondary-side DEV's can access communication paths. The requests from the DEV's include, for example, association (ASS) (i.e. participation in the network), RS reservation (i.e. reservation of a communication slot), RS reset (i.e. reset of a reserved communication slot) and keep-alive (i.e. continuing the participation in the network). The requests from the DEV's are transmitted in these individual request slots without competition. As shown in FIG. 5, in the secondary-side individual request slots, requests from the secondary-side DEV's are transmitted to the primary-side devices (i.e. PNC and DEV's).

(1) Requests lots for participants and (2) request slots for new participants are provided in the secondary-side individual request slots. These request slots for participants are slots where the secondary-side DEV's that have already established association and participated reserve and reset communication slots, and are assigned by the primary-side PNC. Further, these request slots for new participants are slots that can be used by any DEV that has not participated to establish association with new participant DEV's. The former slots show which slot is assigned to which secondary-side DEV by the main beacon from the primary-side PNC, and the secondary-side DEV's make reservation according to this scheduling. The latter slots prevent competition by delaying a timing for a random number of superframes when the secondary-side DEV's request association and when there is no response from the primary-side PNC because association requests from other DEV's of the same secondary-side overlap.

Further, although, with the present embodiment, individual request slots are provided subsequent to two beacons (main beacon and echo beacon) as access periods (i.e. periods are made slots) where all DEV's on both sides can access communication paths, in order to transmit requests from the DEV's without competition, the means to prevent competition is not limited to this. The individual request slots are one example of an alternative means to prevent competition under conditions unique to directional radio waves which make it difficult to prevent competition using carriers. It is also possible to prevent competition by, for example, using polling by PNC's.

Next, after the secondary-side individual request slots end, the secondary-side RS starts. The secondary-side RS is a communication period assigned by the primary-side PNC according to reservation requests from the secondary-side DEV's. This period may be managed as a time or made a slot to manage. Here, an example will be explained where this period is managed as a slot. In the period of RS, for example, data is transferred. As shown in FIG. 5, in the secondary-side RS, for example, data is transferred from the secondary-side DEV's to communicating parties (DEV's) on the primary-side.

As described above, primary subsuperframe 201 covers from transmission of the primary-side main beacon to the end of transfer of the secondary-side RS. Then, secondary subsuperframe 202, which repeats exactly the same configuration except that the primary-side and the secondary-side are switched, continues and one superframe 200 ends.

That is, as shown in FIG. 5, the secondary-side main beacon is transmitted (broadcasted) from the secondary-side PNC to the primary-side devices (i.e. PNC and DEV's). The secondary-side main beacon is a control signal for acquiring synchronization of a timing to start a secondary-side subsuperframe between all primary-side devices (i.e. PNC and DEV's) and for communicating necessary information and commands to the primary-side devices at the same time.

As shown in FIG. 5, the secondary-side echo beacon is transmitted (broadcasted) from the primary-side PNC to the secondary-side devices (i.e. PNC and DEV's). This secondary-side echo beacon is a control signal for reporting to the secondary-side DEV's the details of the secondary-side main beacon transmitted from the secondary-side PNC to the primary-side devices (i.e. PNC and DEV's). The details of the secondary-side echo beacon are the same as the secondary-side main beacon except for a transmission source address and an echo flag in a frame header. By this means, the secondary-side devices (i.e. PNC and DEV's) can share information.

Primary-side individual request slots are slots (i.e. access periods) for making various requests (including association, RS reservation, RS reset and keep-alive) to the network from the primary-side DEV's. As shown in FIG. 5, in the primary-side individual request slots, requests from the primary-side DEV's are transmitted to the secondary-side devices (i.e. PNC and DEV's) without competition. Similar to the secondary-side individual request slots, (1) request slots for participants and (2) request slots for new participants are provided in the primary-side individual request slots.

A primary-side RS is a communication period (either time or slot) assigned by the secondary-side PNC according to reservation requests from the primary-side DEV's. As shown in FIG. 5, in the primary-side RS, for example, data is transferred from the primary-side DEV's to communicating parties (DEV's) on the secondary-side.

Figure 6:
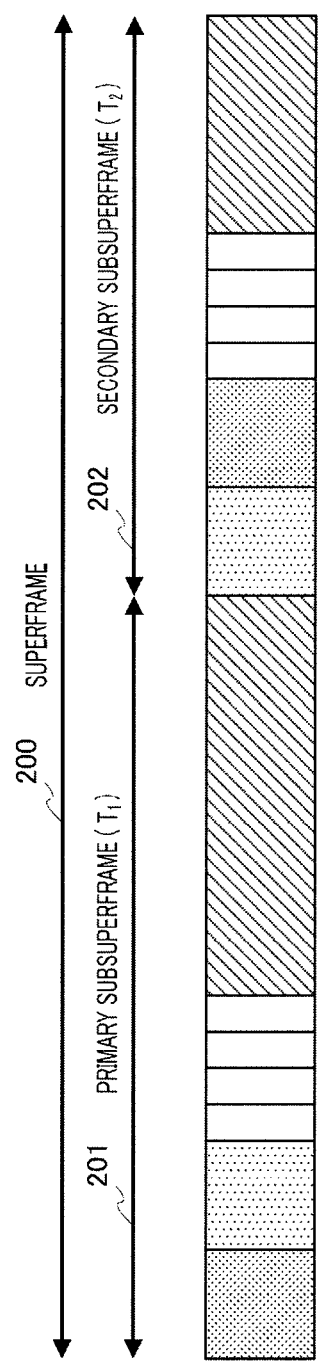
FIG. 6 illustrates asymmetry of subsuperframes.

Further, although, as shown in FIG. 4, the ratio of the periods of primary subsuperframe 201 and secondary subsuperframe 202 is uniform with the present embodiment, the present invention is not limited to this. For example, as shown in FIG. 6, the lengths of the subsuperframes can be made variable according to the amounts of traffic in both directions. In this case, the primary-side and secondary-side PNC's (A1 and A2) perform weighting based on the amounts of traffic in both directions to adjust the lengths of subsuperframes 201 and 202 (i.e. time: $T_1$ and $T_2$). To be more specific, the PNC's (A1 and A2) perform weighting by making variable, for example, the lengths (i.e. time) of RS's managed by the PNC's according to the amounts of traffic. In this case, the respective PNC's (A1 and A2) describe the lengths (i.e. weights) of RS's, in the main beacons on one's side managed by the own PNC's (A1 and A2) and transmit (broadcast) these main beacons. That is, when A1 is on the primary-side, A1 describes the length of the RS managed by A1, in the primary-side main beacon and A2 describes the length of the RS managed by A2, in the secondary-side main beacon. By this means, the timing is reported to the respective DEV's, thereby acquiring synchronization. In this way, by making variable the lengths of subsuperframes, it is possible to make longer the period of the superframe (particularly, RS) in the direction in which the amount of traffic is great and reduce an empty period in the subsuperframes and the entire superframe (that is, it is possible to improve the efficiency of data transfer).

In superframe 200 of the above configuration, various signals are transmitted and received between two PNC's, between a PNC and a DEV, or between two DEV's.

FIG. 7 shows frame formats for various signals used in the present embodiment. Particularly, FIG. 7A shows a beacon frame format, FIG. 7B shows an RS reservation frame format, FIG. 7C shows an RS reset (RSR: Reservation Slot Reset) frame format, FIG. 7D shows an association frame format, FIG. 7E shows a keep-alive frame format and FIG. 7F shows a data frame format.

As described above, there are four kinds of beacons of a primary-side main beacon, a primary-side echo beacon, a secondary-side main beacon and a secondary-side echo beacon. As shown in FIG. 7A for example, a beacon frame configuration is configured with, from its head, a header, PNC information, primary-side terminal information, secondary-side terminal information, RS information and FEC (Forward Error Correction).

The details of items configuring a beacon are as follows. In "header," a transmission source address, a transmission destination address, a frame length, and one of a frame type and upper protocol, are described. In "PNC information," pieces of information related to a PNC, to be more specific, a piconet ID (i.e. an ID and primary/secondary flag of a piconet), an echo flag, a superframe ratio, an MAC (Media Access Control) address of one's PNC, an MAC address of the facing PNC and the next beacon period, are described. In "primary-side terminal information," pieces of information related to primary-side terminals (i.e. DEV's), to be more specific, MAC addresses of the primary-side DEV's, attributes of the primary-side DEV's and individual request slots of the primary-side DEV's, are described. In "secondary-side terminal information," pieces of information related to the secondary-side terminals (i.e. DEV's), to be more specific, MAC addresses of the secondary-side DEV's, attributes of the secondary-side DEV's and individual request slots of the secondary-side DEV's, are described. In "RS information," pieces of RS information on the side managed by one's PNC, to be more specific, the MAC address of this owner, MAC address of the communicating party, one of a slot period (start/end) and slot number, and the priority, are described. In case of echo, details are the same except that only the transmission source address in the header and the echo flag in PNC information are overwritten.

As shown in FIG. 7B for example, a frame configuration of an RS reservation signal is configured with, from its head, a header, a piconet ID, FLAG-1, a transmission source address, a transmission destination address, RS information and FEC. Here, in "FLAG-1," req/rsp/ack (i.e. a type of a frame), an echo flag and a reservation/reset flag are described. "req" refers to a request, "rsp" refers to a response and "ack" refers to an acknowledgement. In case of this RS reservation (that is, a request for a communication slot), the transmission source address is an MAC address of the owner.

An RS reset (RSR) signal employs basically the same frame configuration as the RS reservation signal. That is, as shown in FIG. 7C for example, a frame configuration of an RS reset signal is configured with, from its head, a header, a piconet ID, FLAG-1, a transmission source address, a transmission destination address, RS information and FEC. In case of this RS reset (that is, reset of a communication slot) too, the transmission source address is the MAC address of the owner. Further, the reservation/reset flag distinguishes reservation and reset.

As shown in FIG. 7D for example, a frame configuration of an association signal is configured with, from its head, a header, a piconet ID, FLAG-2, a requester, authentication information and FEC. Here, in "FLAG-2," req/rsp (i.e. a type of a frame), an echo flag and an association/reset flag are described. "Requester" refers to one that requests for association.

As shown in FIG. 7E for example, a frame configuration of a keep-alive signal is configured with, from its head, a header, a piconet ID, FLAG-3, a transmission source address, the next time transmission time and FEC. Here, in "FLAG-3," attributes of DEV's are described.

"Keep-alive" refers to communication that is carried out on a regular basis to check that connection is alive. With the present embodiment, regardless of whether or not communication is performed, keep-alive signals must be transmitted in individual request slots once in every twenty superframes to continue being participants (i.e. members) in the network. Each PNC checks keep-alive signals and deletes the individual request slots for devices that are not present, to remove the overhead of individual request slots and the like.

As shown in FIG. 7F for example, a frame configuration of a data signal is configured with, from its head, a header, data and FEC. "Data" refers to data itself that must be transferred to a communicating party.

With the present embodiment, when each device does not perform communication, that is, when the terminal of each device does not transmit data or when requests for communication are not made in the individual request slots, each device enters reception stand-by mode only in a main beacon, an echo beacon and an individual request slots on the opposite side. In this way, even though power consumed to wait for reception (power consumption due to synchronization processing) is great in UWB, it is possible to reduce the unnecessary time to wait for reception and reduce power consumption.

Figure 8:
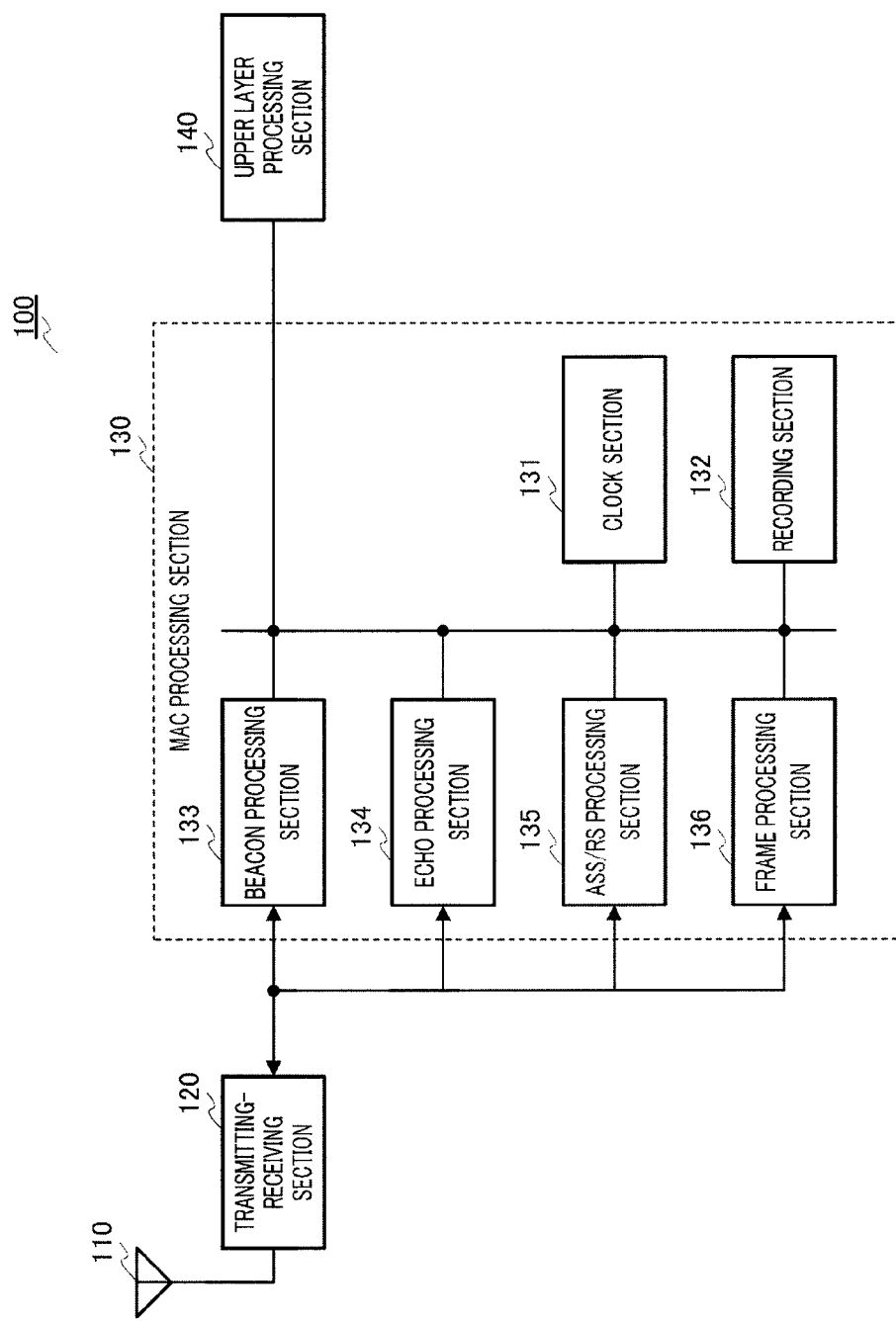
FIG. 8 is a block diagram showing a configuration of a PNC according to the present embodiment.

FIG. 8 is a block diagram showing a configuration of a PNC according to the present embodiment.

PNC 100 (i.e. wireless communication apparatus) shown in FIG. 8 broadly has antenna 110, transmitting-receiving section 120, MAC processing section 130 and upper layer processing section 140.

Antenna 110 is configured with, for example, one directional antenna. The specific configuration of the directional antenna is not limited in particular.

As a physical layer, transmitting-receiving section 120 transmits and receives a UWB signal of a millimeter wave through antenna 110. As described above, the UWB signal refers to a very wide band signal of an extremely short transmission distance and the UWB signal in the millimeter wave band that has directivity is generally used.

MAC processing section 130 carries out MAC protocol processing. MAC processing section 130 has, for example, clock section 131, recording section 132, beacon processing section 133, echo processing section 134, ASS/RS processing section 135 and frame processing section 136.

Clock section 131 has a built-in clock and measures time. Processing sections 133 to 136 are activated at predetermined timings by this clock section 131.

Recording section 132 records information to create frames of various signals. To be more specific, recording section 132 records, for example, information about facing DEV apparatuses, the order of individual request slots, the schedule of RS, the weights of subsuperframes and the like.

Beacon processing section 133 carries out processing to create a main beacon (beacon processing). To be more specific, when a predetermined activation time comes, beacon processing section 133 creates a main beacon in a subsuperframe on one's side using information recorded in recording section 132, and transmits (broadcasts) the created main beacon through transmitting-receiving section 120 and antenna 110.

Echo processing section 134 carries out processing to create an echo beacon (echo processing). To be more specific, when receiving a main beacon from the PNC on the opposite side in a subsuperframe on the opposite side through antenna 110 and transmitting-receiving section 120, echo processing section 134 creates an echo beacon for the subsuperframe on the opposite side utilizing the received main beacon. Next, the created echo beacon is transmitted (broadcasted) through transmitting-receiving section 120 and antenna 110.

ASS/RS processing section 135 carries out processing related to association and reservation/reset of RS (ASS/RS processing). The specific details of this processing will be described below.

Frame processing section 136 carries out processing other than the above beacon processing, echo processing and ASS/RS processing, and frame processing section 136 carries out, for example, processing of data transfer.

Upper layer processing section 140 executes various applications, and creates and outputs transmission data to MAC processing section 130. Further, upper layer processing section 140 receives received data from MAC processing section 130 and carries out application processing.

The operation of PNC 100 of the above configuration will be explained.

When a time to activate the subsuperframe on one's side in superframe 200 comes, clock section 131 activates beacon processing section 133 and creates a main beacon. At this time, beacon processing section 133 receives a request from clock section 131 and describes predetermined information (for example, information about facing DEV apparatuses, the order of individual request slots, the schedule of RS and the weights of the subsuperframes) recorded in recording section 132, and transmits (broadcasts) this beacon through transmitting-receiving section 120 and antenna 110.

Further, in the subsuperframe on the opposite side, after a main beacon is transmitted from the PNC on the opposite side, this main beacon is received by antenna 110, is subjected to required processing in transmitting-receiving section 120 and is reported to echo processing section 134. At this time, based on the weight of the communicating party in the reported main beacon, echo processing section 134 sets in clock section 131 the weight of the wireless communication apparatus of the PNC on one's side and the next main beacon transmission time of the PNC on one's side calculated using the weight of the communicating party and the weight of the apparatus of the PNC on one's side. Then, echo processing section 134 copies an echo beacon from the reported main beacon except for the transmission source address and echo flag, and retransmits (broadcasts) the beacon as the echo beacon.

Further, in periods of the individual request slots in the subsuperframe on one's side, requests transmitted in these periods are transmitted to ASS/RS processing section 135. At this time, when a request is an association request, ASS/RS processing section 135 determines how to make a response based on the details of the association request. Then, when accepting the association request, ASS/RS processing section 135 makes recording section 132 update information about DEV apparatuses and the order of individual request slots and transmits an association response to transmitting-receiving section 120 and antenna 110. Further, when a request is a request for RS reservation/reset, ASS/RS processing section 135 determines a response based on the details of the RS reservation/reset request. Then, when authorizing reservation/reset of an RS, ASS/RS processing section 135 makes recording section 132 update the schedule of RS and transmits an RS reservation response/RS reset response through transmitting-receiving section 120 and antenna 110.

Figure 9:
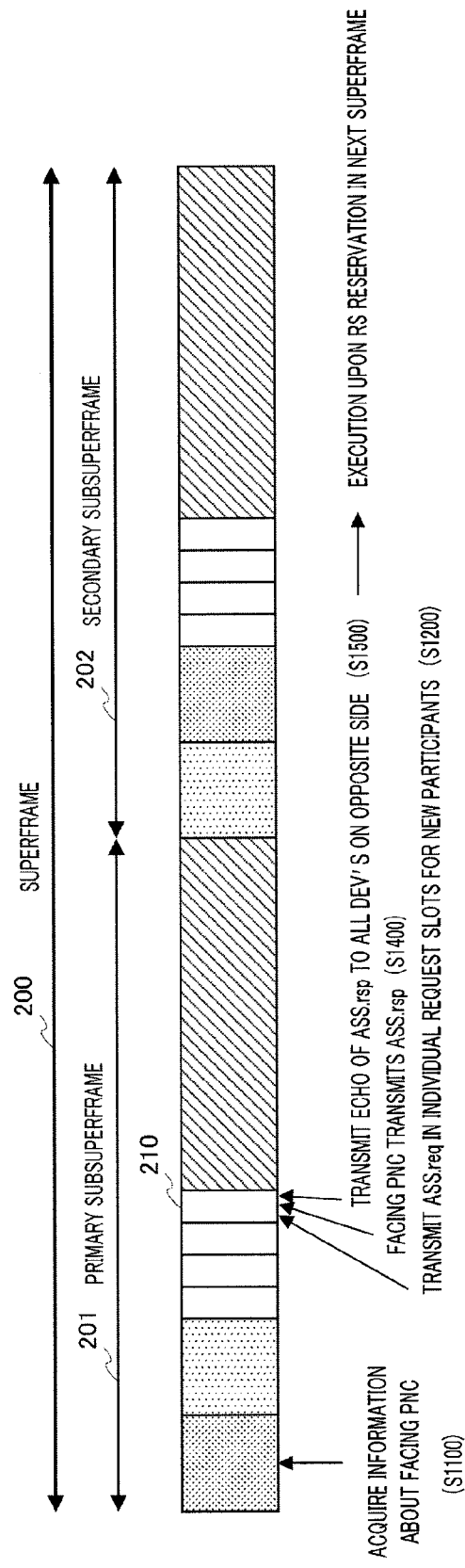
FIG. 9 illustrates processings steps (i.e. sequence) for association according to the present embodiment.
Figure 10:
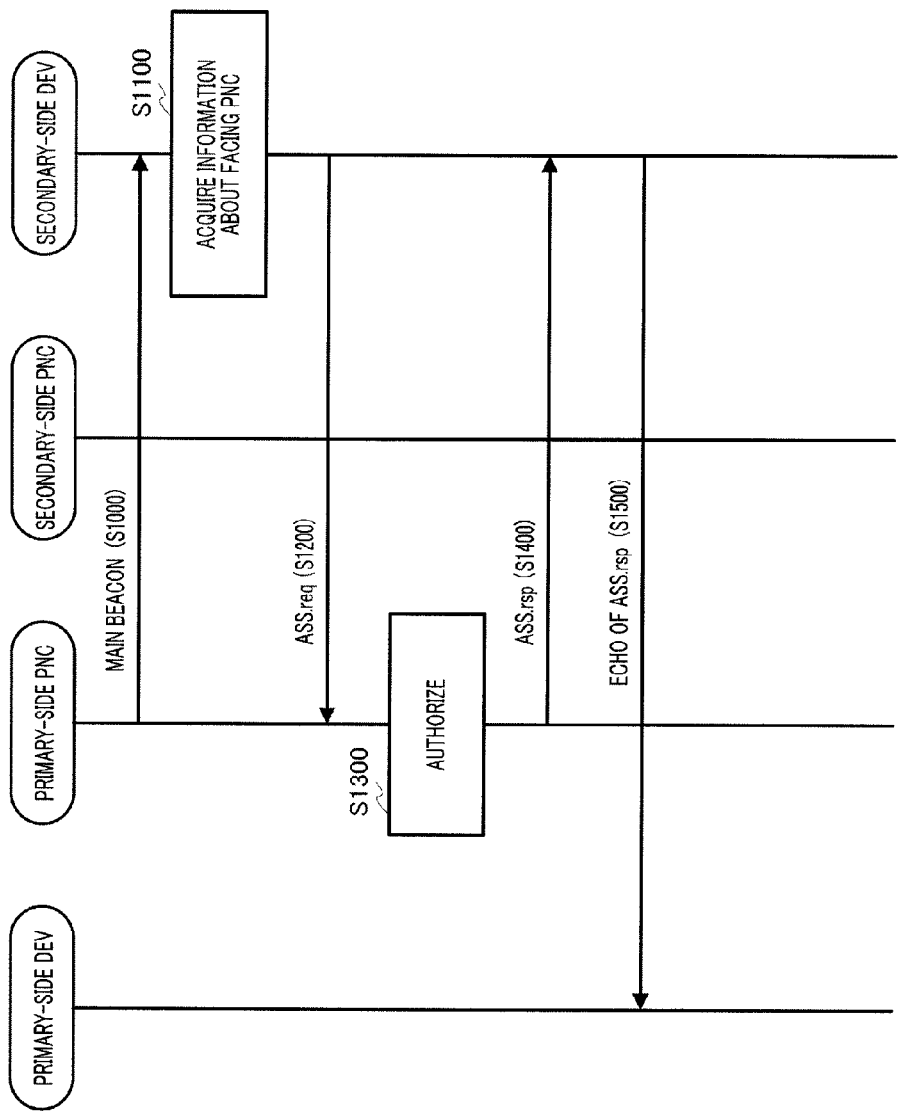
FIG. 10 is a sequence diagram showing details of the association sequence in FIG. 9.

FIG. 9 illustrates processing steps (i.e. sequence) for association according to the present embodiment. FIG. 10 is a sequence diagram showing details of the association sequence in FIG. 9. Further, although a case will be explained as one example where a secondary-side DEV transmits an association request, the same applies when a primary-side DEV transmits an association request.

First, the facing PNC on the opposite side (i.e. the primary-side PNC) transmits (broadcasts) a main beacon in the primary-side main beacon period of primary subsuperframe 201 (S1000). The secondary-side DEV receives this main beacon, acquires information about the facing PNC and checks the position of individual request slot 200 for new participants (S1100).

Then, the DEV transmits an association request (ASS.req) using individual request slot 210 for new participants in the secondary-side individual request slot period in primary subsuperframe 201 (S1200). When receiving the association request, the facing PNC (the primary-side PNC) determines whether or not to authorize the association request and, when authorizing the association request (S1300), transmits the association response (ASS.rsp) to the DEV (S1400). Then, the DEV transmits (broadcasts) an echo of the association response to report this authorization result (i.e. participation in the association) to all DEV's on the opposite side (the primary-side DEV's) (S1500).

As a result, the DEV is registered in recording section 132 of the facing PNC (i.e. the primary-side PNC), and is described in secondary-side terminal information in this primary-side main beacon when the primary-side main beacon in next superframe 200 is transmitted and is authorized. That is, the DEV can make RS reservation with respect to a specific communicating party from next superframe 200.

Figure 11:
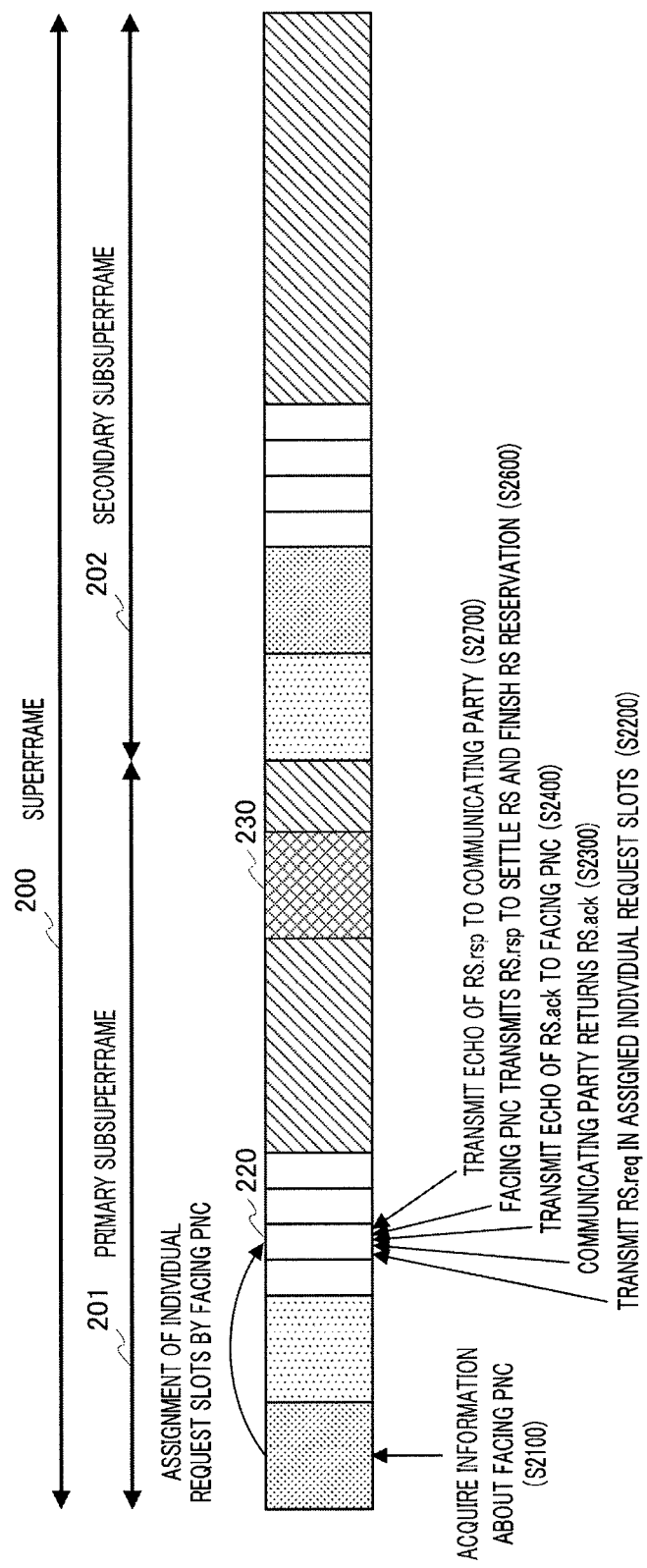
FIG. 11 illustrates processing steps (i.e. sequence) for RS reservation according to the present embodiment.
Figure 12:
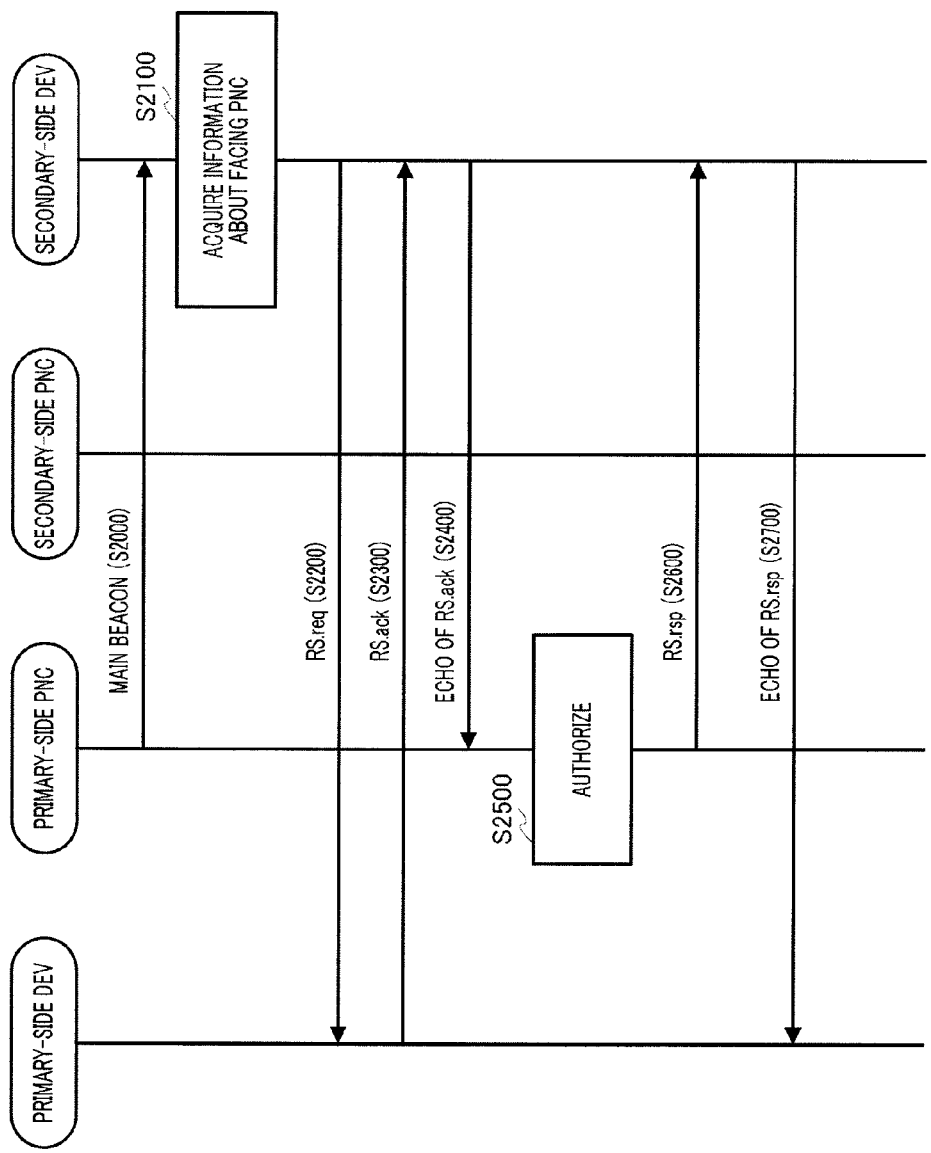
FIG. 12 is a sequence diagram showing details of the RS reservation sequence in FIG. 11.

FIG. 11 illustrates processing steps (i.e. sequence) for RS reservation according to the present embodiment. FIG. 12 is a sequence diagram showing details of the RS reservation sequence in FIG. 11. Further, although a case will be explained here as one example where a secondary-side DEV transmits an RS reservation request, the same applies when a primary-side DEV transmits an RS reservation request.

First, the facing PNC on the opposite side (i.e. primary-side PNC) transmits (broadcasts) a main beacon in the primary-side main beacon period of primary subsuperframe 201 (S2000). The secondary-side DEV receives this main beacon, acquires information about the facing PNC and checks the position of individual request slot 220 assigned to the DEV (S2100).

Then, the DEV transmits an RS reservation request (RS.req) to a specific communicating party on the opposite side (i.e. a primary-side DEV) using individual request slot 220 assigned to the DEV in a secondary-side individual request slot period in primary subsuperframe 201 (S2200). The communicating party on the opposite side returns an ACK signal (RS.ack) to the DEV (S2300). The DEV transmits an echo of the ACK signal (RS.ack) to the facing PNC (i.e. the primary-side PNC) to report information about the ACK signal (RS.ack) to the facing PNC (S2400). When receiving the echo of this ACK signal (RS.ack), the facing PNC determines whether or not to authorize this RS reservation and, when authorizing this RS reservation (S2500), transmits an RS reservation response (RS.rsp) to the DEV (S2600). The DEV transmits an echo of the RS reservation response (RS.rsp) to the communicating party on the opposite side to report this authorization result (i.e. settlement of RS reservation) to the communicating party (S2700).

As a result, the DEV is reported assigned period 230 (either time or a slot of a fixed time interval may be directly designated) from the next main beacon and is able to communicate with the communicating party in the RS period.

Figure 13:
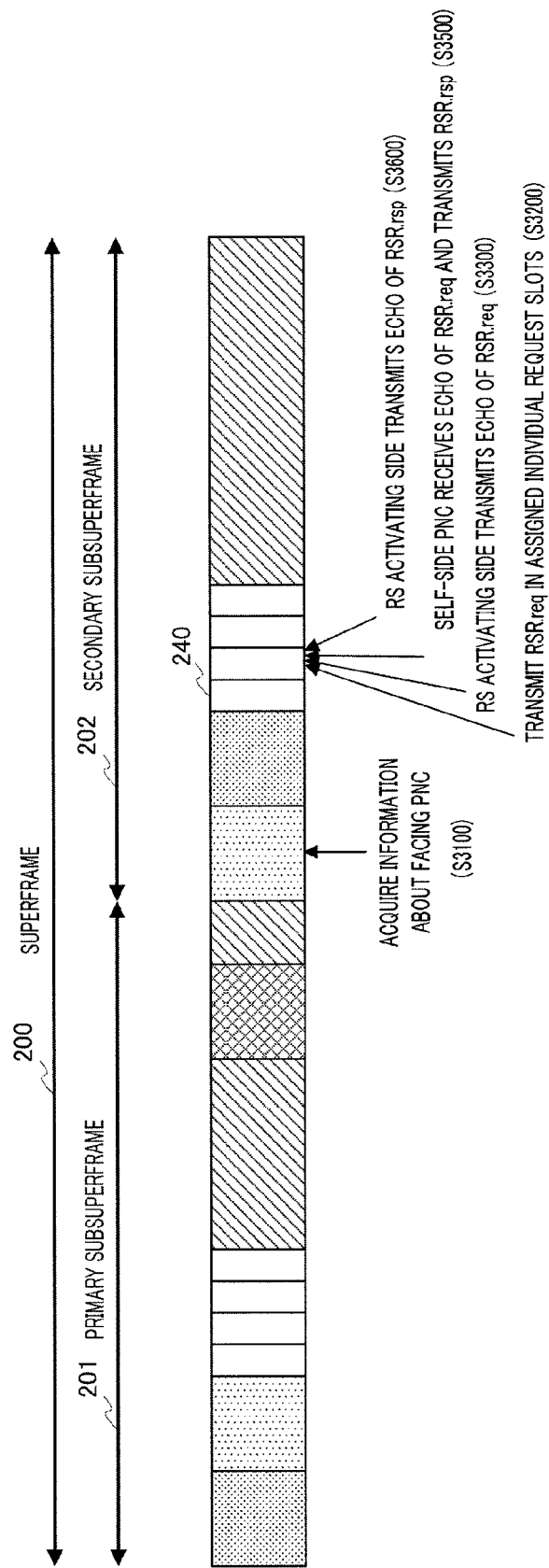
FIG. 13 illustrates processing steps (i.e. sequence) for RS reset according to the present embodiment.
Figure 14:
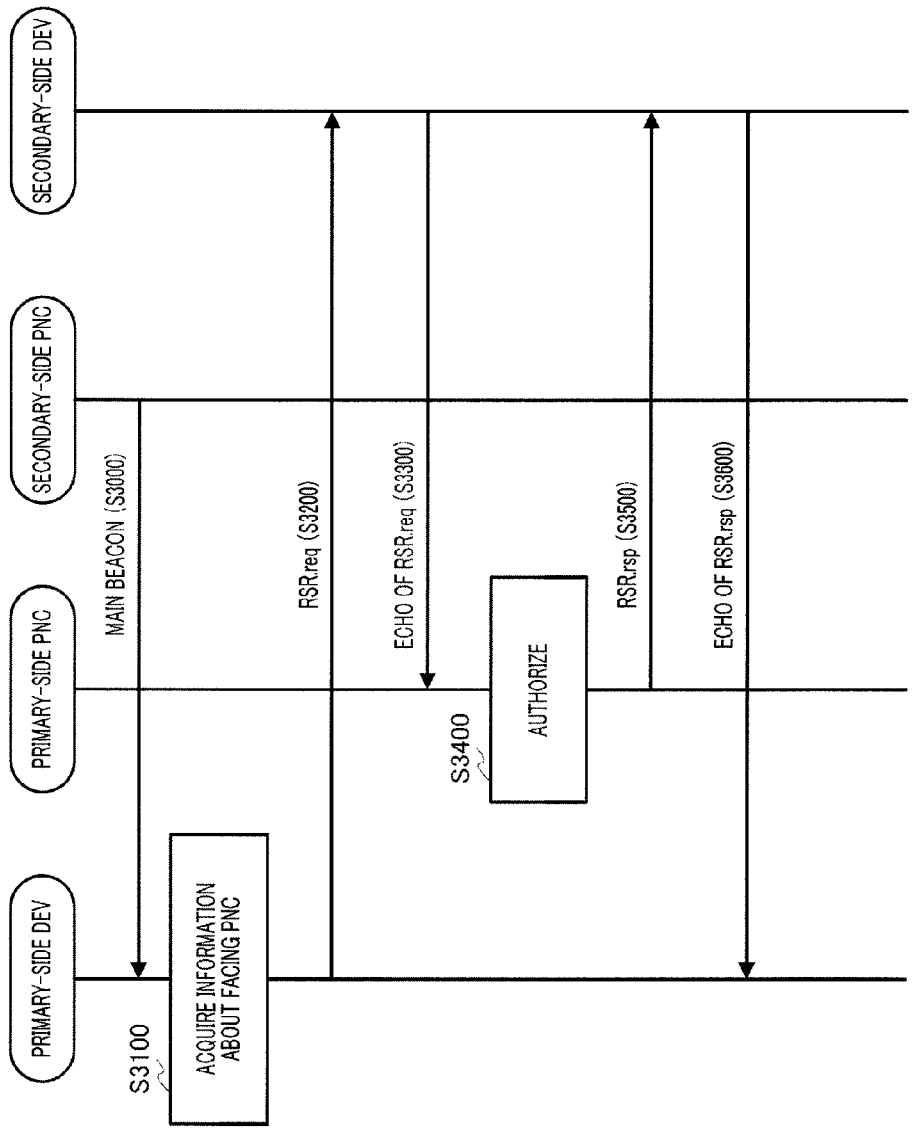
FIG. 14 is a sequence diagram showing details of the RS reset sequence in FIG. 13.

FIG. 13 illustrates processing steps (i.e. sequence) for RS reset according to the present embodiment. FIG. 14 is a sequence diagram showing details of the RS reset sequence in FIG. 13. Further, although a case will be explained here as one example where a primary-side DEV on the RS response side transmits an RS reset request, the same applies when a secondary-side DEV transmits an RS reservation request.

First, the facing PNC on the opposite side (i.e. secondary-side PNC) transmits (broadcasts) a main beacon in the secondary-side main beacon period of secondary subsuperframe 202 (S3000). The primary-side DEV receives this main beacon, acquires information about the facing PNC and checks the position of individual request slot 240 assigned to the DEV (S3100).

Then, the DEV transmits an RS reset request (RSR.req) to the DEV on the opposite side, the RS activating side, (i.e. the secondary-side DEV) in individual request slot 240 assigned to the DEV in a primary-side individual request slot period in secondary subsuperframe 202 (S3200). The DEV on the RS activating side transmits an echo of the RS reset request (RSR.req) to the PNC on one's side (i.e. primary-side PNC) (S3300). When receiving the echo of this RS reset request (RSR.req), the PNC on one's side determines whether or not to authorize this RS reset request and, when authorizing this RS reset request (S3400), transmits an RS reservation response (RSR.rsp) to the opposite-side DEV on the RS activating side (S3500). The DEV on the RS activating side transmits an echo of the RS reset response (RSR.rsp) to the DEV to report this authorization result (i.e. settlement of RS reset) to the DEV (S3600). By this means, reset is completed.

Figure 15:
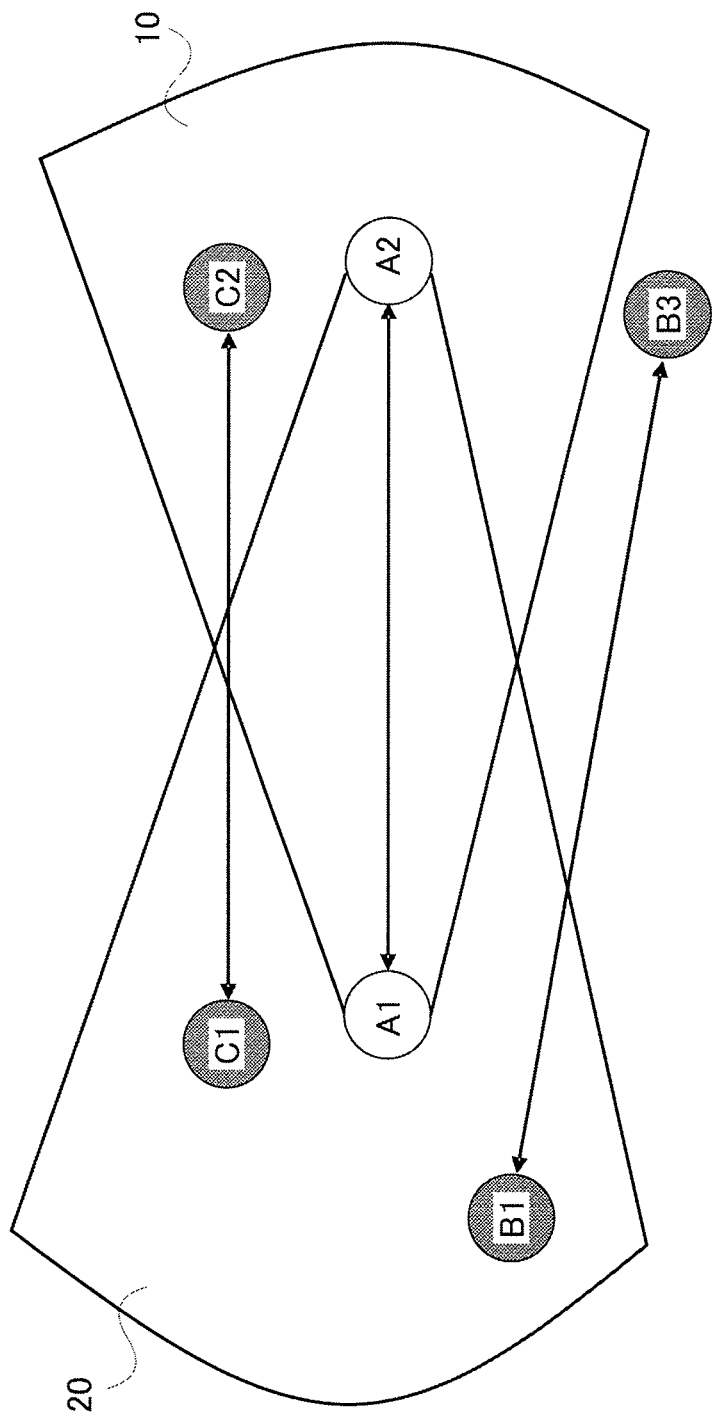
FIG. 15 illustrates communication to the outside of the network according to the present embodiment.

FIG. 15 illustrates communication to the outside of the network according to the present embodiment.

With the present embodiment, in the RS period, the RS request from the requester (B1) may be transmitted by any device (B3). For example, reception acknowledgement (ACK) in response to data transmission can be transmitted by a facing device. The ACK signal may include control information to some degree. Further, depending on cases, communication is possible with a device that is not associated with PNC's.

This enables communication even when, like devices B1 and B3 shown in FIG. 15, one device (B3) is outside the areas of PNC's (A1 and A2). In this case, device B1 is given, for example, a reservation slot (RS1) from the PNC (A2), and performs communication under exclusive control according to, for example, RTS/CTS (Request to Send/Clear to Send) (instead of CSMA/CA) in RS1. By this means, even when B3 is outside the areas of the PNC's, B3 can communicate with B1. Further, even when there is a PNC for B3 other than A1 and A2, it is possible to avoid collision by carrying out communication under exclusive control.

In this way, according to the present embodiment, in an adhoc network using directional radio waves, two PNC's that function as master devices are arranged such that their directivities face each other, and a superframe is divided into two subsuperframes in the time domain to allow one PNC to control one subsuperframe and allow the other PNC to control the other subsuperframe, so that, even if there are competing DEV's to which directional radio waves cannot reach when the network is configured with only one PNC, it is possible to control these competing DEV's and realize multiaccess easily.

Embodiment 2

Figure 16:
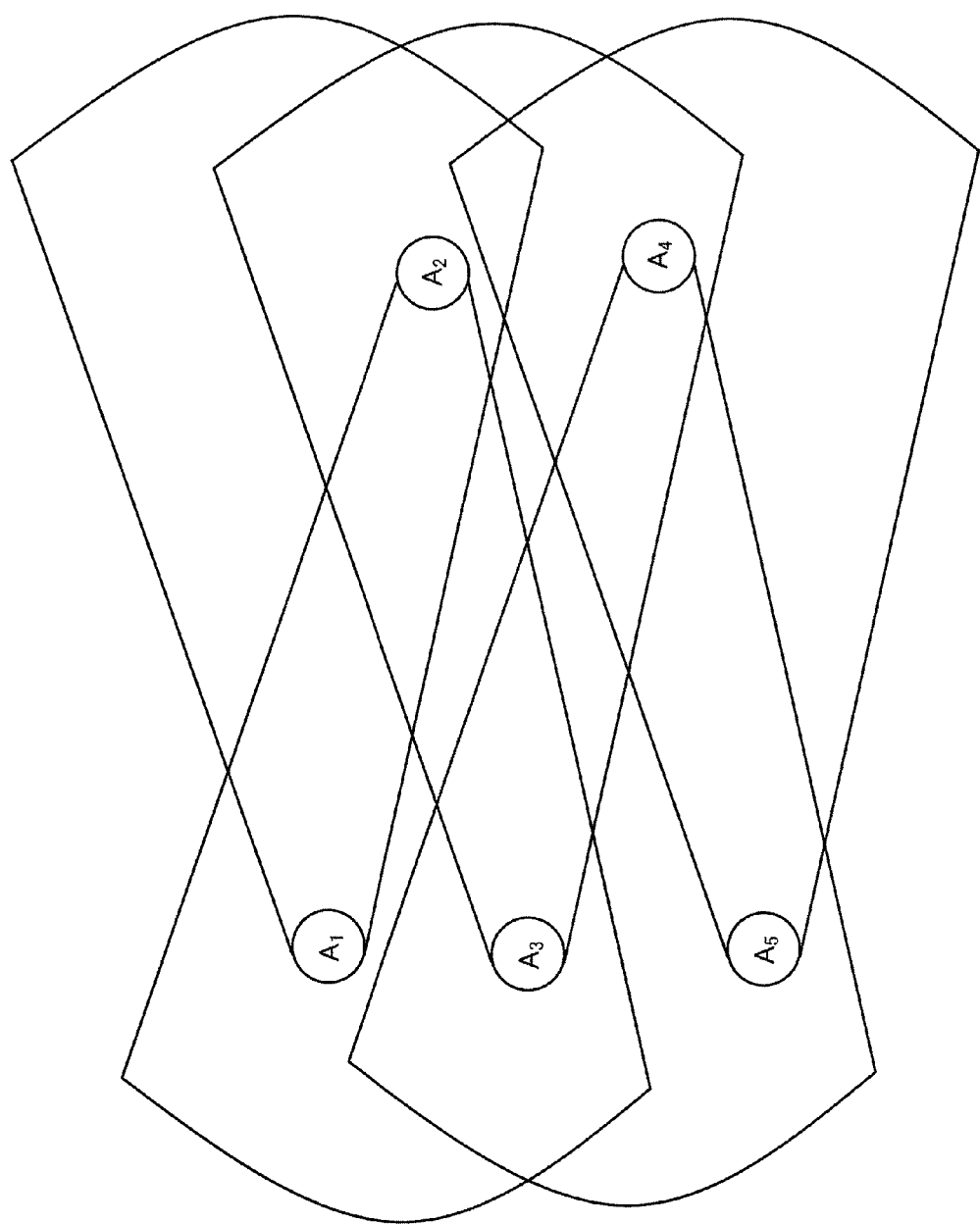
FIG. 16 shows a network configuration to which the wireless communication method according to Embodiment 2 of the present invention is applied.

Next, Embodiment 2 of the present invention will be explained in detail with reference to the drawings. FIG. 16 is a schematic view showing a network configuration to which the wireless communication method according to Embodiment 2 of the present invention is applied.

With the present embodiment, antennas for transmitting and receiving directional radio waves are used. Further, one PNC serves as a master, another PNC serves as a slave, the one PNC which becomes the master serves as a slave for a third PNC and has two relationships as a master and as a salve, and this state of the PNC's is referred to as a nested state. In this case, a PNC which serves as a master of one PNC (referred to as "self-side PNC") is the upper-side PNC and a PNC which serves as a slave of this one PNC is the lower-side PNC. The self-side PNC establishes master-slave relationships with two PNC's and, consequently, establishes the relationship of an echo back with two PNC's. Embodiment 2 differs from Embodiment 1 in that one PNC can communicate with two PNC's in its communication range. Thus, master-slave chains are configured, so that several PNC's configure one synchronized network.

To be more specific, when the PNC (A2) shown in FIG. 16 is the self-side PNC, the state where the PNC (A1) is the upper-side PNC and the PNC (A3) is the lower-side PNC will be referred to as the nested state. With the present embodiment, the master PNC configures a subsuperframe before the slave PNC, and, consequently, when the entire superframe is defined, which PNC is the upper-side PNC and which PNC is the lower-side PNC, are automatically determined. Here, A1 in FIG. 16 is the upper-side PNC with respect to A2, and, in this sense, A1 is the primary-side PNC with respect to A2. By contrast with this, A2 is the upper-side PNC with respect to A3 and, consequently, A2 is the primary-side PNC with respect to A3. Further, A3 is the upper-side PNC with respect to A4, and such a nested state continues to A5.

Figure 17:
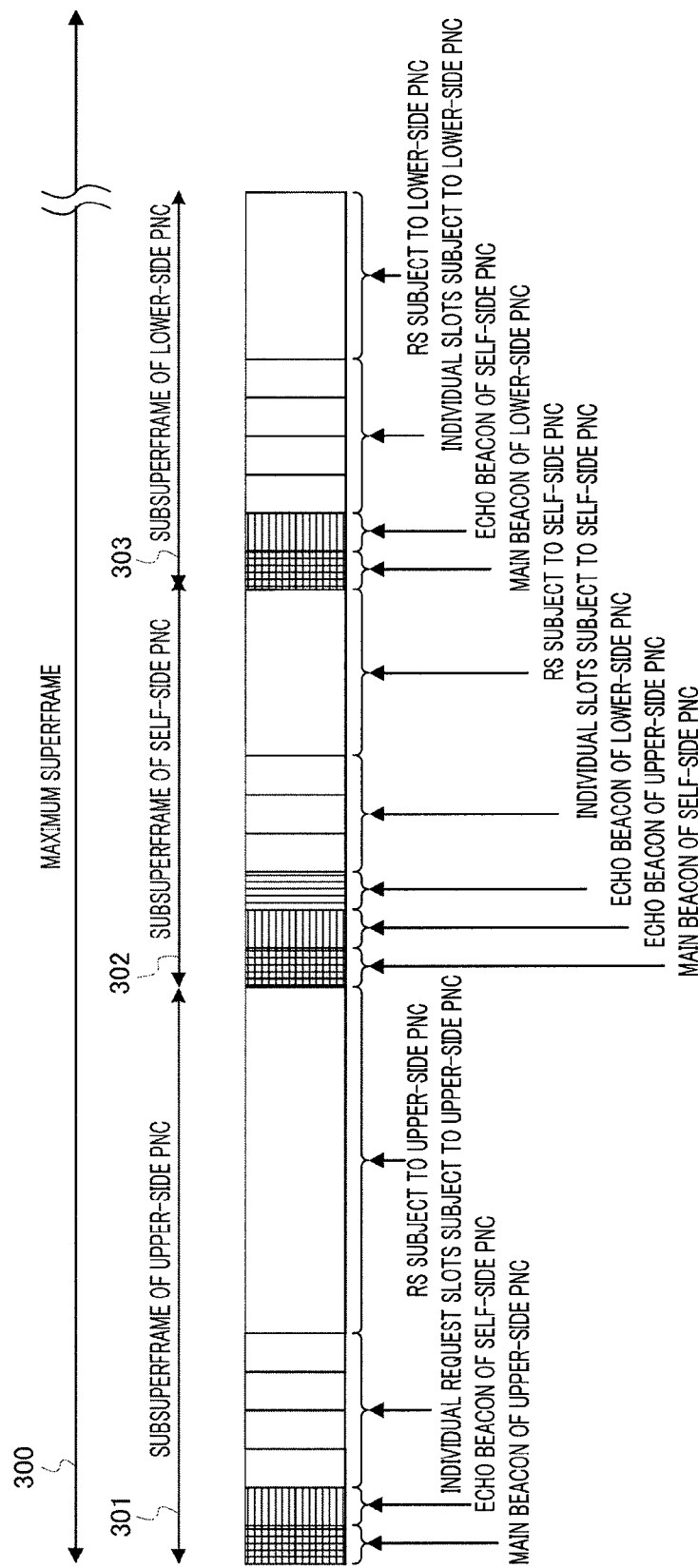
FIG. 17 shows a configuration example of a superframe in the network in FIG. 16.

FIG. 17 shows a configuration example of a superframe configured by PNC's A1 to A3 in the network in FIG. 16. The superframe is configured with three subsuperframes and this configuration repeats every maximum superframe length. The maximum superframe length is a predetermined time length. Every PNC of the present embodiment repeats a subsuperframe on one's side and subsuperframes on the opposite sides in this time length. The reason for determining the maximum superframe in advance is because, for example, even when another combination of PNC's using the same system are nearby and it is difficult to configure one superframe, if the maximum superframe lengths match, (sub) superframes are arranged in a cycle of the same repetition, so that collision with another superframe does not take place.

Network communication of the present embodiment will be explained based on A2. Further, FIG. 17 shows a signal received by A2. The superframe shown in FIG. 17 is configured with three subsuperframes, to be more specific, a subsuperframe group of upper-side subsuperframe 301, self-side subsuperframe 302 and lower-side subsuperframe 303. Although this subsuperframe group can continue to the subsuperframes of A4 and A5, A2 is not in the range to receive beacons from these PNC's A4 and A5.

Upper-side subsuperframe 301 is the subsuperframe for transmitting a main beacon from the PNC (A1). Upper-side subsuperframe 301 is configured with, from its head, four portions including a main beacon of the upper-side PNC, an echo beacon of the self-side PNC, individual request slots subject to the upper-side PNC and an RS (reservation slot) subject to the upper-side PNC.

Further, self-side subsuperframe 302 is a subsuperframe for transmitting a main beacon from the PNC (A2). Self-side subsuperframe 302 is configured with, from its head, five portions including a main beacon of the self-side PNC, an echo beacon of the upper-side PNC, an echo beacon of the lower-side PNC, individual request slots subject to the self-side PNC and an RS subject to the self-side PNC.

Further, lower-side subsuperframe 303 is configured with, from its head, four portions including a main beacon of the lower-side PNC, an echo beacon of the self-side PNC, individual request slots subject to the lower-side PNC and an RS subject to the lower-side PNC.

With the present embodiment, in the self-side subsuperframe, there are slots for transmitting two echo beacons (for example, an echo beacon of the upper-side PNC and an echo beacon of the lower-side PNC) in response to one beacon (for example, a beacon of the self-side PNC). That is, there are an upper echo beacon slot (an echo beacon of the upper-side PNC) and a lower echo beacon slot (an echo beacon of the lower-side PNC) in this echo beacon slot. Here, the PNC (A4) without the upper-side PNC or the lower-side PNC is referred to as an "end point PNC." Here, this endpoint PNC configures a subsuperframe formed with only an echo beacon of one of the lower-side PNC and the upper-side PNC.

In subsuperframe 301 of the upper-side PNC (A1) the main beacon is transmitted from the upper-side PNC (A1) to the self-side PNC (A2). The echo beacon of the PNC (A2) is transmitted from the self-side PNC (A2) to the upper-side PNC (A1).

The individual request slots subject to the upper-side PNC are slots for making various requests to the network from the upper-side DEV's as access periods where all upper-side DEV's can access communication paths. The requests from the DEV's include, for example, association (ASS) (i.e. participation in the network), RS reservation (i.e. reservation of a communication slot), RS reset (i.e. reset of a reserved communication slot) and keep-alive (i.e. continuing the participation in the network). The requests from the DEV's are transmitted in these individual request slots without competition.

In subsuperframe 302 of the selfs-side PNC (A2), the main beacon is transmitted from the self-side PNC (A2) to the upper-side PNC (A1) and the lower-side PNC (A3). The echo beacon of the upper-side PNC (A1) is transmitted from the upper-side PNC (A1) to the self-side PNC (A2). The echo beacon of the lower-side PNC (A3) is transmitted from the lower-side PNC (A3) to the self-side PNC (A2).

The individual request slots subject to the self-side PNC (A2) refer to slots for making various requests to the network from the self-side DEV's as access periods where all self-side DEV's can access communication paths. The requests from the DEV's include, for example, association (ASS) (i.e. participation in the network), RS reservation (i.e. reservation of a communication slot), RS reset (i.e. reset of a reserved communication slot) and keep-alive (i.e. continuing the participation in the network). The requests from the DEV's are transmitted in these individual request slots without competition because the requests are assigned in individual request slots by the main beacon.

In subsuperframe 303 of the lower-side PNC (A3) the main beacon is transmitted from the lower-side PNC (A3) to the self-side PNC (A2) and PNC (A4). The echo beacon of the self-side PNC (A2) is transmitted from the self-side PNC (A2) and the self-side PNC (A4) to the lower-side PNC (A3).

The individual request slots subject to the lower-side PNC (A3) refer to slots for making various requests to the network from the lower-side DEV's as access periods where all lower-side DEV's can access communication paths. The requests from the DEV's include, for example, association (ASS) (i.e. participation in the network), RS reservation (i.e. reservation of a communication slot), RS reset (i.e. reset of a reserved communication slot) and keep-alive (i.e. continuing the participation with the network). The requests from the DEV's are transmitted in these individual request slots without competition.

FIG. 18 shows frame formats for various signals used in the present embodiment. Particularly, FIG. 18G shows a beacon frame format, FIG. 18H shows a PNC pairing request frame format, and FIG. 18I shows a subsuperframe move request frame format. The beacon in FIG. 18G is used instead of the beacon in FIG. 7 of Embodiment 1. Further, the PNC pairing request in FIG. 18H and the subsuperframe move request in FIG. 18I are frame formats added in the present embodiment.

As shown in FIG. 18G for example, a beacon frame configuration is configured with, from its head, a header, PNC information, self-side terminal information, upper-side terminal information, lower-side terminal information, RS information and FEC.

Further, as shown in FIG. 18H for example, a PNC pairing request frame configuration is configured with, from its head, a header, a piconet ID, FLAG-4, an authentication code, a subsuperframe length and FEC. FLAG-4 is configured with a req/rsp flag, an upper/lower flag and an OK/NG flag.

Further, as shown in FIG. 18I for example, a subsuperframe move request frame configuration is configured with, from its head, a header, FLAG-5, a movement width and FEC. FLAG-5 is configured with a req/rsp flag, a moving direction (+/−) flag and an OK/NG flag. Further, PNC's can operate as DEV's and, consequently, transmit "PNC pairing request," "subsuperframe move request," "RS reservation," "RS reset," "association" and "keep-alive" in individual request slot periods.

The details of elements configuring a beacon are as follows. In "header," a transmission source address, a transmission destination address, a frame length, and one of a frame type and upper protocol, are described. In "PNC information," pieces of information related to a PNC, to be more specific, a piconet ID (i.e. an ID and upper/middle/lower flag of a piconet), an echo flag, an upper subsuperframe length, a self subsuperframe length, a lower subsuperframe length, an MAC address of the self-side PNC, an MAC address of the upper-side PNC and an MAC address of the lower-side PNC, are described.

In "self-side terminal information," pieces of information related to self-side terminals (i.e. DEV's), to be more specific, MAC addresses of the self-side DEV's, attributes of the self-side DEV's and individual request slots of the self-side DEV's, are described.

In "upper-side terminal information," pieces of information related to upper-side terminals (i.e. DEV's), to be more specific, MAC addresses of the upper-side DEV's, attributes of the upper-side DEV's and individual request slots of the upper-side DEV's, are described.

In "lower-side terminal information," pieces of information related to lower-side terminals (i.e. DEV's), to be more specific, MAC addresses of the lower-side DEV's, attributes of the lower-side DEV's and individual request slots of the lower-side DEV's, are described.

In "RS information," pieces of RS information managed by each PNC, to be more specific, an MAC address of an owner, an MAC address of a communicating party, one of a slot period (start/end) and slot number, and priority, are described. In case of an echo, details are exactly the same as in Embodiment 1 except that only the transmission source address in the header and the upper/lower flag in PNC information are overwritten.

Further, in RS reservation and RS reset, a flag is added that describes with which DEV of one of the upper-side PNC and lower-side PNC communication needs to be established. By this means, when reset is performed, it is possible to decide in which slot of one of the upper-side and lower-side a reset frame is transmitted.

In PNC information of a beacon, time lengths of a self subsuperframe length, an upper subsuperframe length, and a lower subsuperframe length are described. By this means, the start of the beacon of the upper-side PNC (A1) is referred to when the start point of the subsuperframe of the self-side PNC (A2) is determined. Consequently, the start point of the self-side subsuperframe, delayed by the time length of the upper-side subsuperframe, is determined. Further, the start point of the lower-side subsuperframe, delayed by the time length of the self-side subsuperframe, is determined.

In this way, start points of a plurality of subsuperframes are determined. Further, it is assumed that transmission of a plurality of subsuperframes is repeated every time from the start using the predetermined time length of the maximum superframe.

Further, the upper-side subsuperframe and the lower-side subsuperframe pair the head and tail of the self-side subsuperframe, so that it is possible to recognize the head of each subsuperframe based on the upper-side subsuperframe length and the lower-side subsuperframe length. For example, the self-side PNC (A2) can recognize the head of the lower-side subsuperframe taking into account the upper-side subsuperframe length and the self-side subsuperframe length.

With this configuration, a plurality of subsuperframes need not occupy the entire period corresponding to the maximum superframe. In an empty period of a subsuperframe, subsuperframes of a different protocol that can share the beacon by means of time division can coexist.

For example, when receiving one of a beacon and echo beacon, PNC's of a different protocol (for example, PNC's that operate in a different network) need not to serve as the upper-side PNC or the lower-side PNC.

Further, these PNC's can declare subsuperframes by transmitting beacons by defining start timings of self subsuperframe lengths adopted by the PNC's based on the self subsuperframe lengths, upper subsuperframe lengths, lower subsuperframe lengths and maximum superframe lengths so as not to overlap with start timings of subsuperframes of other PNC's. Moreover, the PNC (A4) can configure a network only with the PNC (A5). By so doing, the PNC's of a different protocol that do not overlap in the time domain from each other can coexist.

In this way, when there is an empty period for the lower-side PNC or the upper-side PNC of end point PNC and when there is a sufficient empty period before or after a subsuperframe in which the end point PNC participates, the end point PNC can make a pair with another PNC and operate as the lower-side PNC or the upper-side PNC.

To be more specific, when there is an empty period for a PNC on the lower-side of the PNC (A3) and when there is a sufficient empty period before or after a subsuperframe in which the PNC (A4) participates, the PNC (A4) can make a pair with another PNC (A5) and operate as the PNC (A4) on the lower-side of the PNC (A3).

In other words, after the subsuperframe of the PNC (A3), it is possible to transmit the subsuperframe of the PNC (A4). In order to realize this, the PNC (A4) requests to another PNC (A5) to participate (associate) in the network. Then, the PNC (A4) outputs in the individual request slot, the PNC pairing request shown in FIG. 18H to another PNC (A5), to determine the PNC on the lower-side. When this PNC pairing request is authorized by another PNC (A5), the PNC (A4) can transmit a beacon and an echo beacon to another PNC (A5) of the lower-side PNC.

Further, although a case has been explained with the present embodiment where A4 and A5 make a pair, A4 can participate in the network by making a pair with A3.

A more specific example will be explained with reference to FIG. 19 and FIG. 20. FIG. 19 shows an example of the relationship between transmission and reception of signals between devices in the maximum superframe in FIG. 17. FIG. 19 shows a case where A4 makes a pair with A5 and arranges a subsuperframe in the lower-side of A3. Further, there is an empty period between the subsuperframe of A3 and the subsuperframe of A4 because A3 leaves a possibility that another PNC continues to the lower-side of A3.

Further, FIG. 20 shows another example of the relationship between transmission and reception of signals between devices in the maximum superframe in FIG. 17. FIG. 20 shows a case where the subsuperframe is arranged on the upper-side of A3. Further, A4 overlaps the subsuperframe of A1 in the time domain and A5 overlaps the subsuperframe of A2 in the time domain. However, as is clear from arrangement of communication areas in FIG. 16, A1 and A4, and A2 and A5 do not interfere with each other when they perform transmission, because they are in different communication areas.

With the examples shown in FIG. 19 and FIG. 20, there is an empty period for a PNC on the lower-side of the PNC (A3) and there is a sufficient empty period before and after the subsuperframe of the PNC (A3) in the maximum superframe in which the PNC (A4) is about to participate. The PNC (A4) can make a pair with the PNC (A5) and operate as the PNC (FIG. 19) on the lower-side of the PNC (A3) or the PNC (FIG. 20) on the upper-side of the PNC (A3). In this way, as the lower-side PNC or the upper-side PNC, the PNC (A4) and PNC (A5) can transmit a beacon and an echo beacon to each other.

Next, a case will be explained where, when one PNC (for example, the PNC (A4)) declares a subsuperframe using a beacon so as not to overlap a start timing of the subsuperframe of another PNC (for example, the PNC (A3)), a transmission period for the subsuperframe of a PNC (for example, the PNC (A2)) on the upper-side of the another PNC and a transmission period for a subsuperframe of the one PNC (for example, the PNC (A4) overlap.

Figure 21:
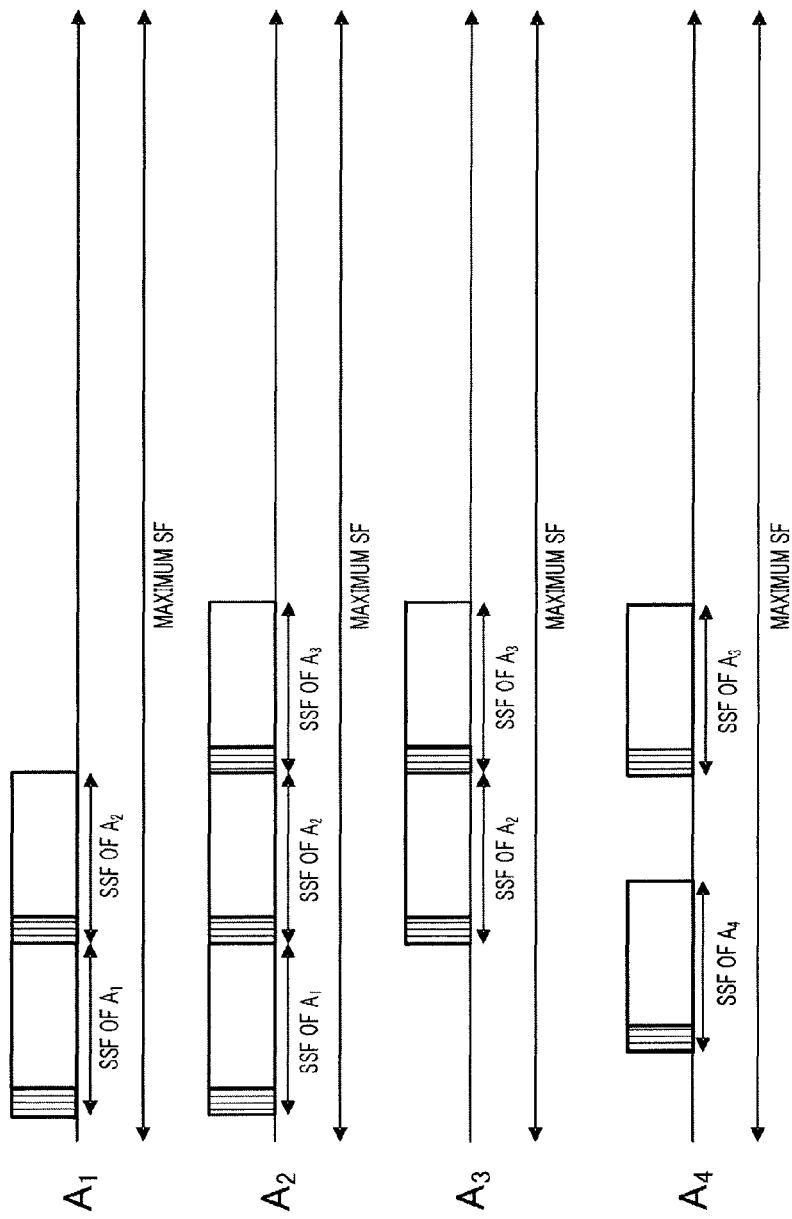
FIG. 21 shows periods when it is difficult to declare subsuperframes in the superframe.

FIG. 21 shows a period when it is difficult to declare subsuperframes in the maximum superframe. For example, the beacon of the PNC (A3) includes information about the subsuperframe lengths of the PNC's (A1 and A2) on the upper-side of the PNC (A3) in PNC information. Therefore, when the PNC (A4) receives the beacon from the PNC (A3), as shown in FIG. 21, it is difficult for the PNC (A4) to declare a subsuperframe in the period of the subsuperframe of the PNC (A3) and, in addition, in the period of the subsuperframes of the PNC's (A1 and A2). This is because the communication areas of A2 and A4 overlap as is clear from the communication areas of each PNC shown in FIG. 16.

Figure 22:
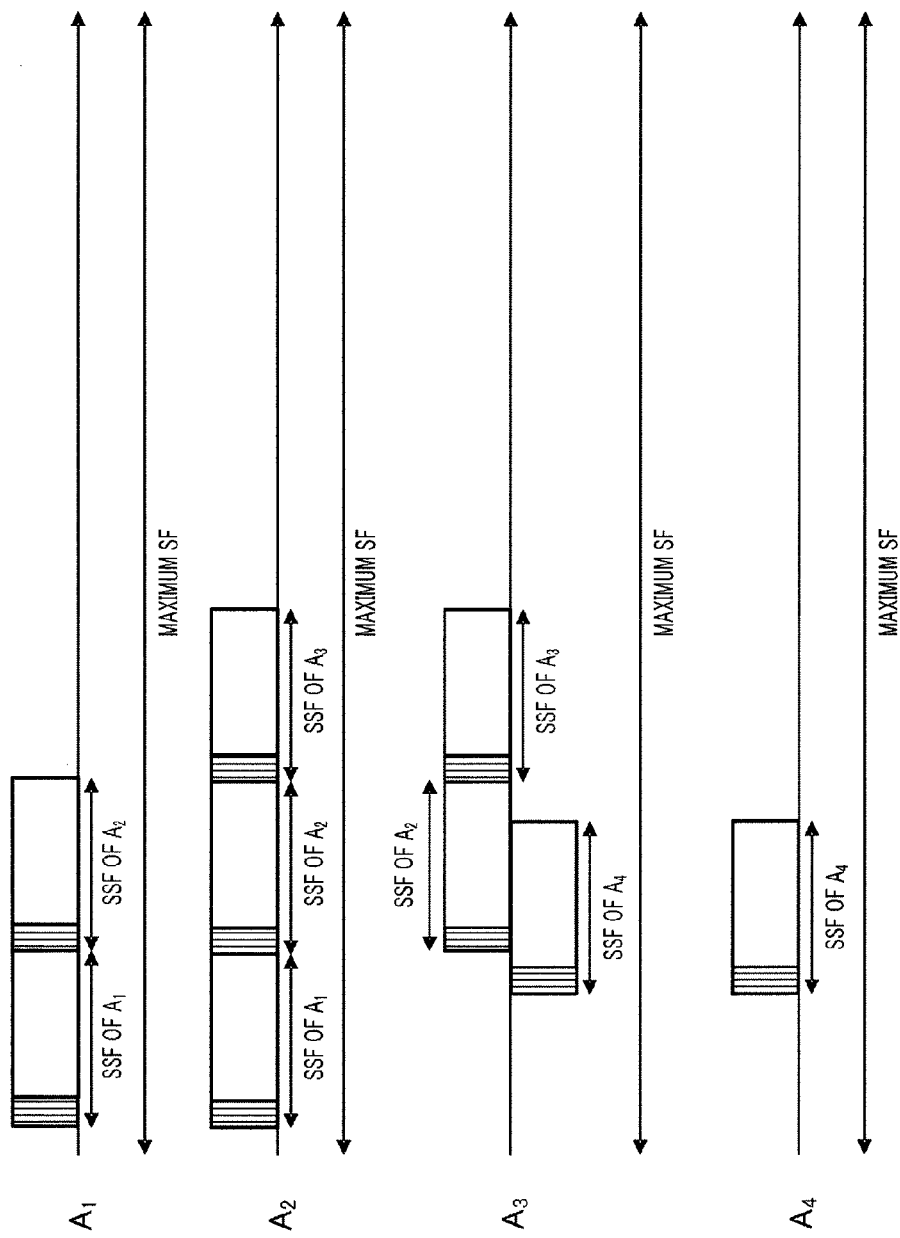
FIG. 22 shows an example where subsuperframes overlap in the superframe.
Figure 23:
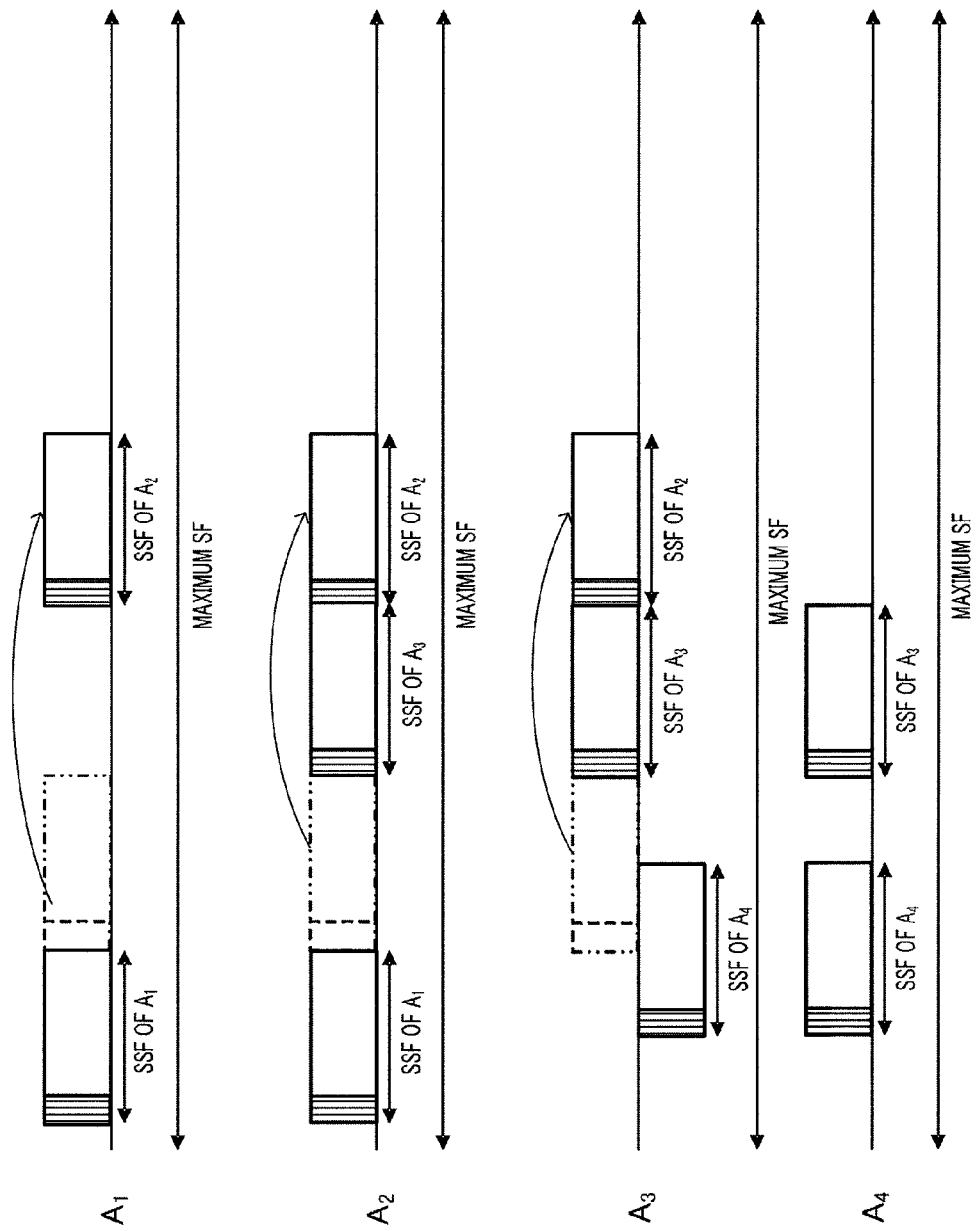
FIG. 23 shows an example where subsuperframes move in the superframe.

FIG. 22 shows an example where subsuperframes overlap in the maximum superframe. Further, in FIG. 22, the subsuperframes of A4 and A2 overlap. FIG. 23 shows an example where subsuperframes move in the maximum superframe.

For example, when the PNC (A4) newly moves in a reception area of the PNC (A2), as shown in FIG. 22, there are cases where the PNC (A4) receives the overlapped subsuperframes of the PNC (A2) and the PNC (A4). In this case, the PNC (A4) outputs the PNC pairing request showing that the PNC (A4) is on the upper-side of the PNC (A2) and the PNC (A2) is on the lower-side of the PNC (A3), to the PNC (A2) through the PNC (A3). Further, as a DEV, the PNC (A4) can transmit "PNC pairing request" using the individual request slot period or add details of the PNC pairing request in a beacon frame and transmit the beacon frame.

When this PNC pairing request is authorized, the PNC (A3) can make a subsuperframe move request to the PNC (A2) to change an offset of a beacon time. The subsuperframe move request from the PNC (A3) is directed to establishing association with the PNC (A2) and communicating the desired subsuperframe start time to the PNC (A2). When receiving the maximum superframe move request from the PNC (A3), as shown in FIG. 23 for example, the PNC (A2) starts transmitting the subsuperframe at a start time designated with respect to the PNC (A2).

Figure 24:
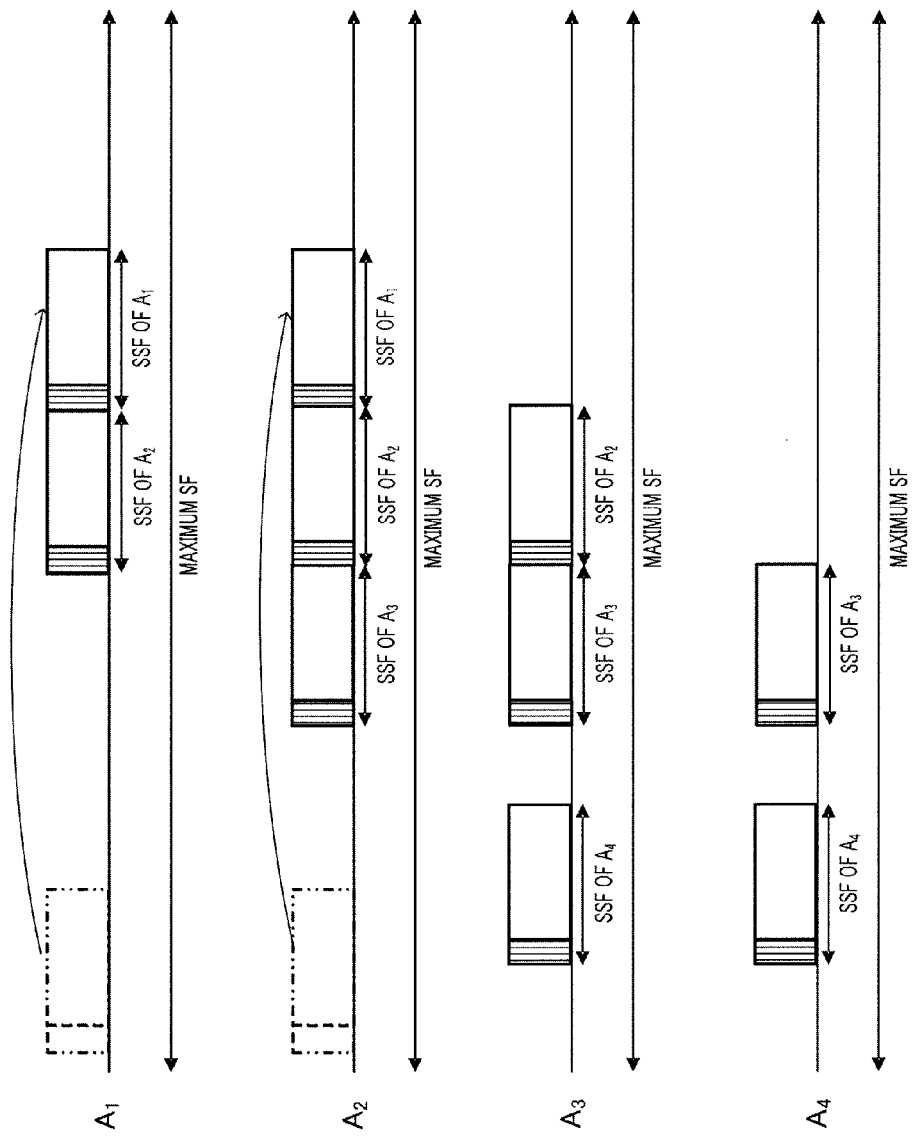
FIG. 24 shows an example where layers for PNC's change in the superframe.

Further, the PNC (A1) can serve as a PNC on the lower-side of the PNC (A2). FIG. 24 shows an example where layers for PNC's change in the maximum superframe. For example, when the PNC (A2) reports to the PNC (A1) using a beacon that the PNC (A2) has moved, the PNC (A1) outputs the PNC pairing request to the PNC (A2) to serve as a PNC on the lower-side of the PNC (A2). When the PNC pairing request is authorized by the PNC (A2), as shown in FIG. 24, the PNC (A1) can serve as the lower-side PNC.

In this way, the beacon of each PNC needs to define information about the terminal of each PNC as information matching the upper-side PNC or the lower-side PNC. Accordingly, when one PNC has the master-slave relationships with both the upper-side PNC and the lower-side PNC, the one PNC has three pieces of terminal information including information about the terminal of this one PNC. Further, RS information is defined in the RS time in the order assigned to the self-side subsuperframe and is assigned.

Further, in RS reservation and RS reset, a flag is added that describes with which DEV subject to one of the upper-side PNC and lower-side PNC communication needs to be established. By this means, when reset is performed, it is possible to decide in which slot in one of the upper-side and lower-side a reset frame is transmitted.

Further, DEV's of each PNC need to handle frame reception in individual request slots in upper-side and lower-side subsuperframes in addition to the subsuperframe of the PNC in which the DEV's participate. When the DEV's become subject to a plurality of PNC's, it is necessary to monitor subsuperframes of all PNC's in which the DEV's have participated and subsuperframes of the upper-side and lower-side PNC's of all PNC's.

As explained with the present embodiment, subsuperframes can coexist between three or more PNC's.

Figure 25:
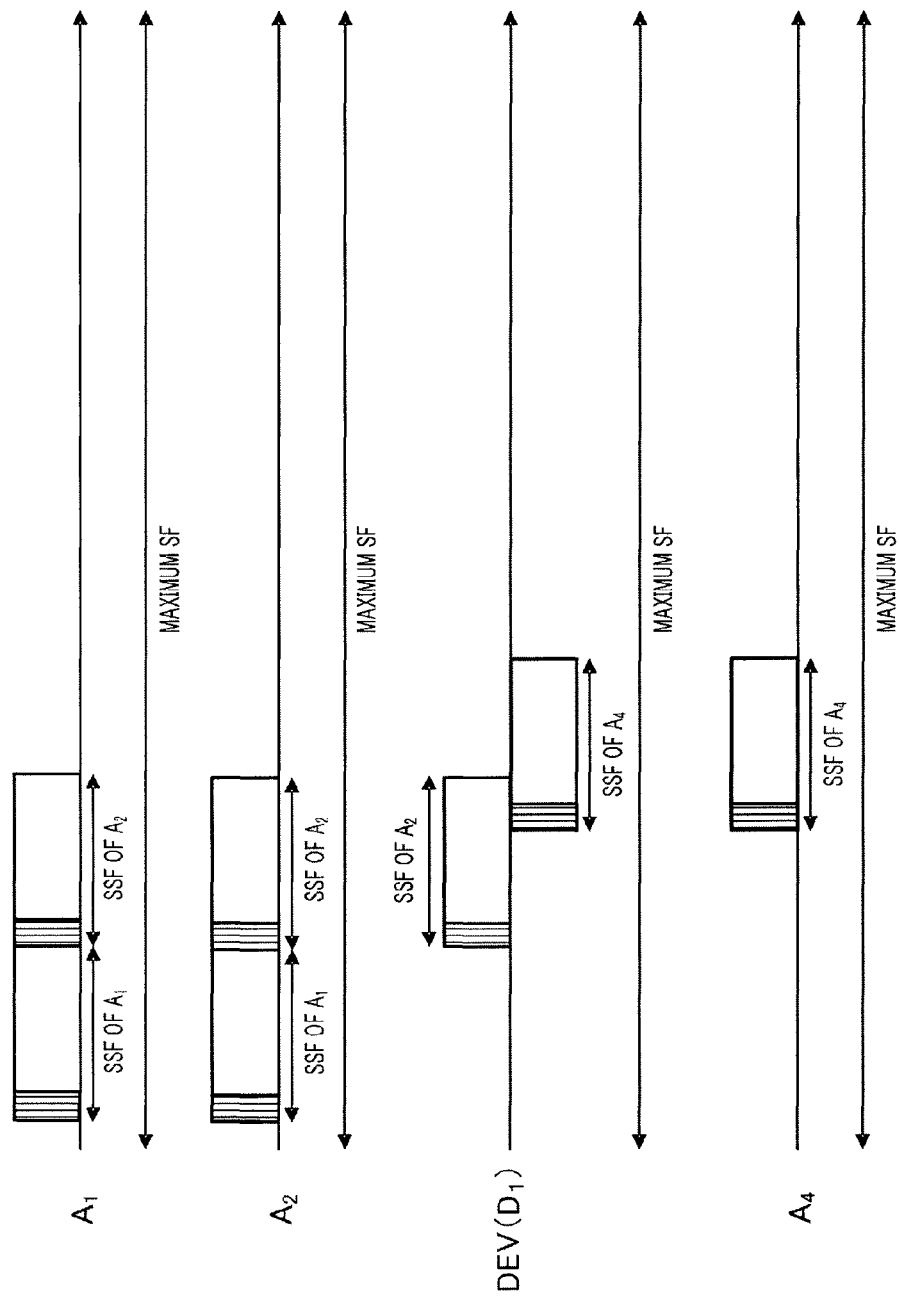
FIG. 25 shows an example where subsuperframes overlap in the superframe.
Figure 26:
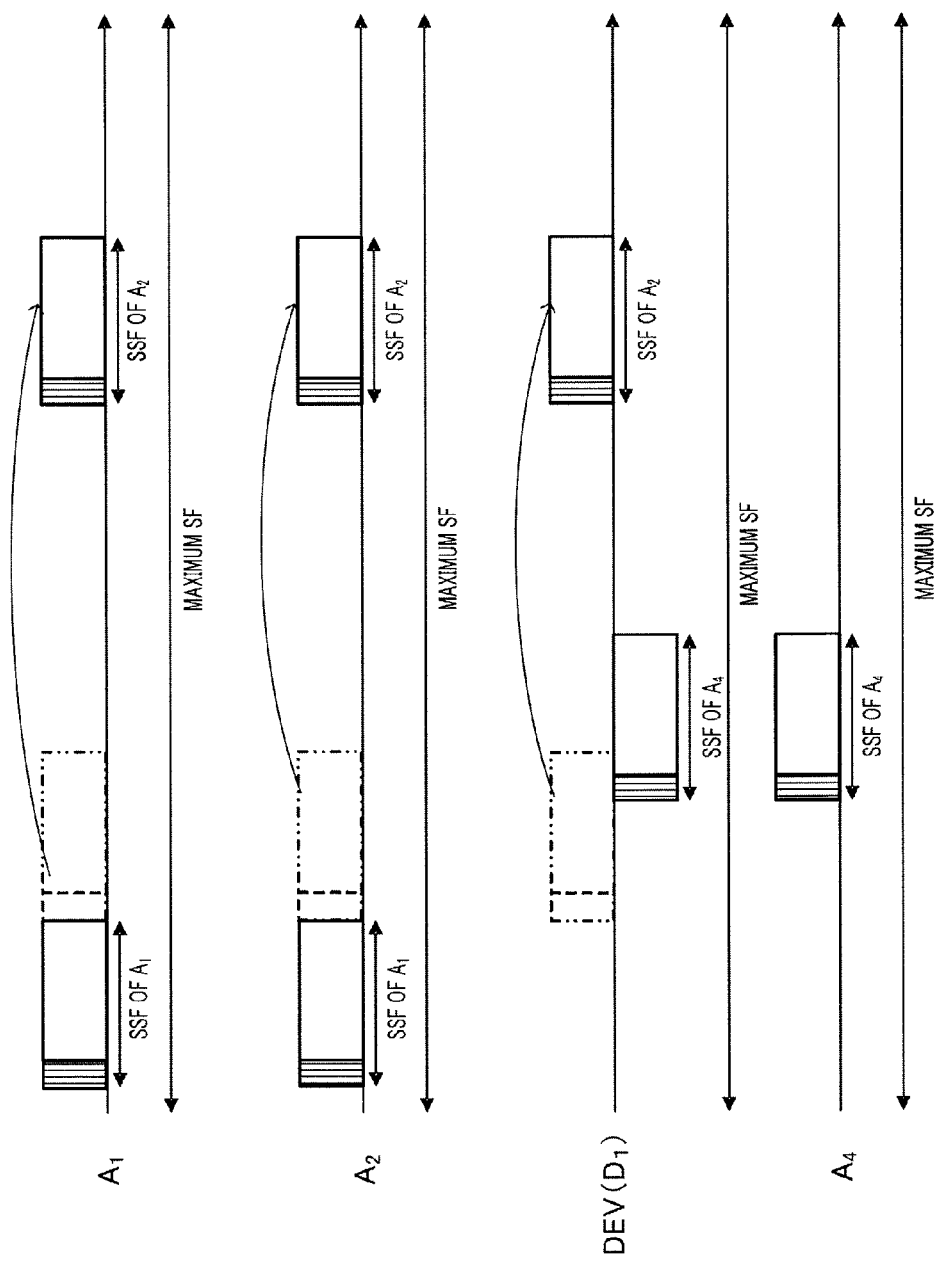
FIG. 26 shows an example where subsuperframes move in the superframe.

FIG. 25 shows an example where subsuperframes overlap in the maximum superframe and a DEV (D1) subject to the PNC (A2) is arranged in the overlapped portion of the communication areas of the PNC (A2) and PNC (A4). Further, the subsuperframes of A4 and A2 overlap in FIG. 25. FIG. 26 shows an example where subsuperframes have moved in the maximum superframe.

For example, when the PNC (A4) newly moves to a reception area of the PNC (A2), as shown in FIG. 25, there are cases where the PNC (A4) receives the overlapped subsuperframes of the PNC (A2) and the PNC (A4). In this case, the PNC (A4) outputs a PNC pairing request showing that the PNC (A4) is on the upper-side of the PNC (A2) and the PNC (A2) is on the lower-side of the PNC (A4), to the PNC (A2) through the DEV (D1) in the individual request slot period. For example, in the RS period, the PNC (A4) communicates with the DEV (D1), and then the DEV (D1) and the PNC (A2) communicate in the individual request slot period.

When this PNC pairing request is authorized, the DEV (D1) makes a subsuperframe move request to the PNC (A2) to change an offset of a beacon period. The subsuperframe move request from the DEV (D1) is directed to establishing association with the PNC (A2) and communicating the desired subsuperframe start time to the PNC (A2). When receiving the maximum superframe move request from the DEV (D1), as shown in FIG. 26 for example, the PNC (A2) starts transmitting a subsuperframe at a start time designated with respect to the PNC (A2).

Figure 27:
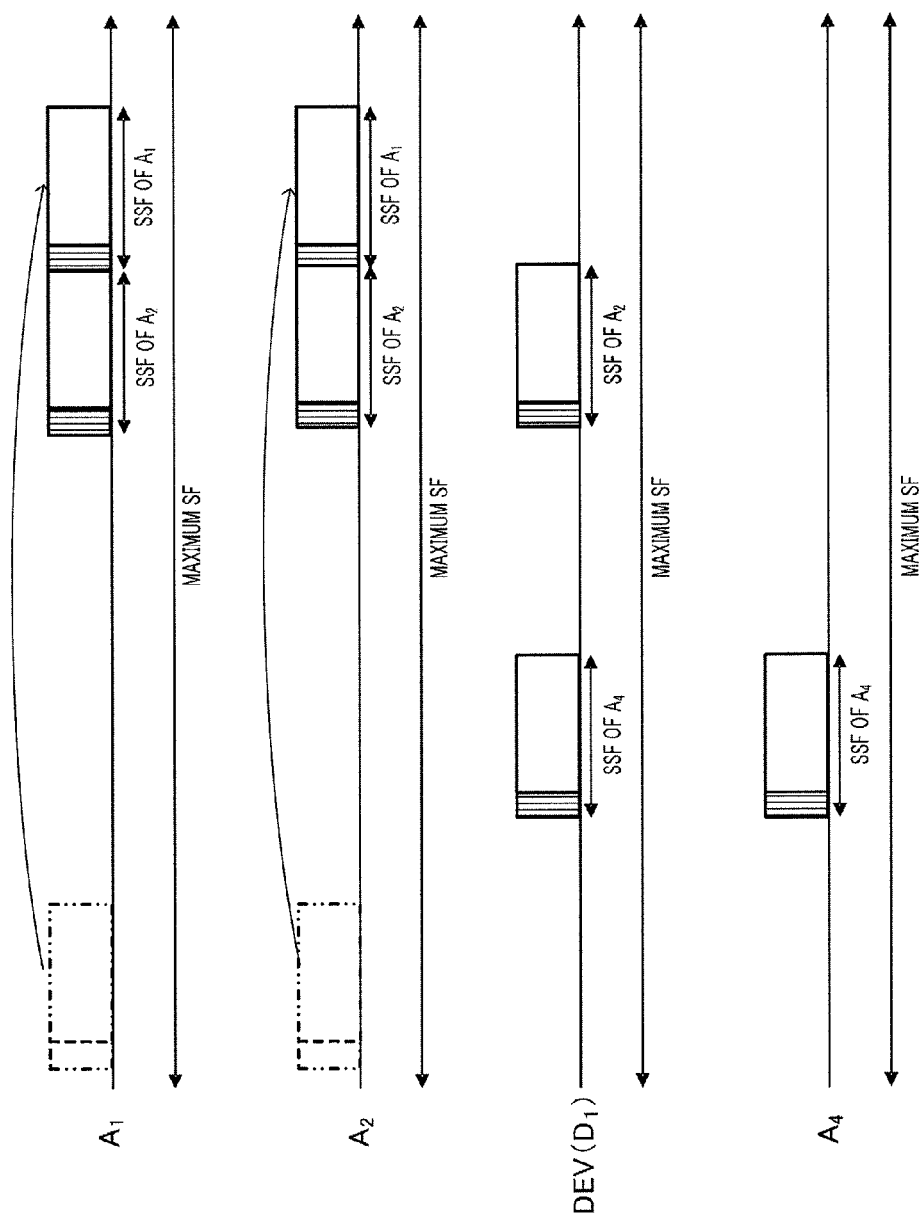
FIG. 27 shows an example where layers for PNC's change in the superframe.

Further, the PNC (A1) can serve as a PNC on the lower-side of the PNC (A2). FIG. 27 shows an example where layers for PNC's change in the maximum superframe. For example, when the PNC (A2) reports to the PNC (A1) using a beacon that the PNC (A2) has moved, the PNC (A1) outputs the PNC pairing request to the PNC (A2) to serve as the PNC on the lower-side of the PNC (A2). When the PNC pairing request is authorized, the PNC (A1) can serve as the PNC on the lower-side of the PNC (A2) as shown in FIG. 27.

Further, although, with the present embodiment, the upper-side subsuperframe, the self-side subsuperframe and the lower-side subsuperframe of subsuperframes of PNC's continue, it is possible to designate beacon start time offset values with respect to the upper-side and lower-side such that the subsuperframes do not continue. Such a configuration can readily be derived from the examples explained with the above embodiments.

INDUSTRIAL APPLICABILITY

The wireless communication method according to the present invention provides an advantage of realizing multi-access easily in an adhoc network using directional radio waves and, consequently, is useful for an effective protocol in, for example, a network of wireless communication apparatuses that are directed to transferring moving images or speech data by radio using directional radio waves.

The disclosures of Japanese Patent Application No. 2007-010818, filed on Jan. 19, 2007, and Japanese Patent Application No. 2008-008142, filed on Jan. 17, 2008, including the specifications, drawings and abstracts, are incorporated herein by reference in their entirety.

The invention claimed is:

1. A wireless communication method whereby a plurality of master wireless communication apparatuses, which control at least one slave wireless communication apparatus in a communication area using a directional radio wave, perform communication using a superframe, the wireless communication method comprising:
arranging the master wireless communication apparatuses such that directivities of respective directional radio waves to be transmitted face each other; and
controlling communication by dividing the superframe into subsuperframes in a time domain and assigning the respective subsuperframes to each of the master wireless communication apparatuses and each of the master wireless communication apparatuses transmitting a beacon in the assigned subsuperframe, wherein:
the directional radio wave is a radio wave in a millimeter wave band having a strong directivity;
the beacon includes (i) a header including a transmission source address, (ii) information including a flag that indicates no echo, and (iii) peripheral equipment control information;
the master wireless communication apparatus transmits the beacon; and
another master wireless communication apparatus different from the master wireless communication apparatus changes, in the received beacon, the transmission source address, and the flag to a flag that indicates echo, without changing the peripheral equipment control information, and retransmits the changed beacon, as an echo beacon, to the slave wireless communication apparatus in a communication area of the other master wireless communication apparatus and out of a communication area of the master wireless communication apparatus.

2. The wireless communication method according to claim 1, wherein:
each of the master wireless communication apparatuses configures a sub-piconet with the slave wireless communication apparatus that is in the communication area of the master wireless communication apparatus, that orients directivity toward the master wireless communication apparatus and that can communicate with the master wireless communication apparatus; and
each of the subsuperframes is assigned by time division to the master wireless communication apparatus and the slave wireless communication apparatus that configure the sub-piconet.

3. The wireless communication method according to claim 2, wherein each of the subsuperframes includes a predetermined access period for transmitting a request from the slave wireless communication apparatus configuring the sub-piconet, to a corresponding master wireless communication apparatus.

4. The wireless communication method according to claim 3, wherein the access period comprises:
an individual access period for individually transmitting a request from the slave wireless communication apparatus that participates in a network; and
an access period for a new participant for transmitting a participation request from a slave wireless communication apparatus that does not participate in the network.

5. The wireless communication method according to claim 1, wherein lengths of the subsuperframes are adjustable unevenly according to amounts of traffic in respective directions.

6. The wireless communication method according to claim 1, wherein the slave wireless communication apparatus communicates with a wireless communication apparatus that is not subject to a network, in an assigned communication period using a predetermined exclusive control scheme.

7. The wireless communication method according to claim 6, wherein a fourth master wireless communication apparatus of the plurality of master wireless communication apparatuses that is not connected with a network transmits a piconet coordinator (PNC) pairing request for acquiring authorization to transmit a subsuperframe of the fourth master wireless communication apparatus before and after a subsuperframe group that is already assigned.

8. The wireless communication method according to claim 1, wherein, when a second and a third master wireless communication apparatuses of the master wireless communication apparatuses are arranged facing a first master wireless communication apparatus and when the first master wireless communication apparatus transmits the beacon, the second and the third master wireless communication apparatuses transmit the echo beacon to the first master wireless communication apparatus.

9. The wireless communication method according to claim 8, wherein:
when the second master wireless apparatus transmits the beacon, the first master wireless communication apparatus transmits the echo beacon; and
when the third master wireless communication apparatus transmits the beacon, the first master wireless communication apparatus transmits the echo beacon.

10. The wireless communication method according to claim 1, wherein the master wireless communication apparatus transmits a subsuperframe move request for moving subsuperframes that are already arranged, to another master wireless communication apparatus.

11. The wireless communication method according to claim 1, wherein a frame configuration of the beacon comprises:
terminal information about a terminal configuring a sub-piconet with a second master wireless communication apparatus; and
terminal information about a terminal configuring a sub-piconet with a third master wireless communication apparatus.

12. The master wireless communication apparatus according to claim 1, wherein the slave wireless communication apparatus copies a received signal resulting from a request for assignment of a communication period, and retransmits the copied signal.

13. A wireless communication method whereby a plurality of master wireless communication apparatuses, which control at least one slave wireless communication apparatus in a communication area using a directional radio wave, perform communication using a superframe, the wireless communication method comprising:
arranging the master wireless communication apparatuses such that directivities of respective directional radio waves to be transmitted face each other; and
controlling communication by dividing the superframe into subsuperframes in a time domain and assigning the respective subsuperframes to each of the master wireless communication apparatuses and each of the master wireless communication apparatuses transmitting a beacon in the assigned subsuperframe, wherein:
each of the master wireless communication apparatuses configures a sub-piconet with the slave wireless communication apparatus that is in the communication area of the master wireless communication apparatus, that orients directivity toward the master wireless communication apparatus and that can communicate with the master wireless communication apparatus;
each of the subsuperframes is assigned by time division to the master wireless communication apparatus and the slave wireless communication apparatus that configure the sub-piconet; and
each of the subsuperframes includes a predetermined access period for transmitting a request from the slave wireless communication apparatus configuring the sub-piconet, to a corresponding master wireless communication apparatus, wherein the access period comprises:
an individual access period for individually transmitting a request from the slave wireless communication apparatus that participates in a network; and
an access period for a new participant for transmitting a participation request from a slave wireless communication apparatus that does not participate in the network, and
when starting communication with another slave wireless communication apparatus, the slave wireless communication apparatus requests an assignment of a communication period using the individual access period.

14. The wireless communication method according to claim 13, wherein the slave wireless communication apparatus copies a received signal resulting from the request for the assignment of the communication period and retransmits the copied signal.

15. A wireless communication method whereby a plurality of master wireless communication apparatuses, which control at least one slave wireless communication apparatus in a communication area using a directional radio wave, perform communication using a superframe, the wireless communication method comprising:
arranging the master wireless communication apparatuses such that directivities of respective directional radio waves to be transmitted face each other; and
controlling communication by dividing the superframe into subsuperframes in a time domain and assigning the respective subsuperframes to each of the master wireless communication apparatuses and each of the master wireless communication apparatuses transmitting a beacon in the assigned subsuperframe, wherein:
the master wireless communication apparatus transmits the beacon including synchronization control information and peripheral equipment control information; and
when one of the master wireless communication apparatuses transmits the beacon, another master wireless communication apparatus retransmits the received beacon as an echo beacon to the master wireless communication apparatus that transmitted the beacon, after changing a transmission source address in the received beacon and adding information showing that the beacon is an echo beacon, wherein:
when second and third master wireless communication apparatuses of the master wireless communication apparatuses are arranged facing a first master wireless communication apparatus and when the first master wireless communication apparatus transmits the beacon, the second and the third master wireless communication apparatuses transmit the echo beacon to the first master wireless communication apparatus;
when the second master wireless apparatus transmits the beacon, the first master wireless communication apparatus transmits the echo beacon; and
when the third master wireless communication apparatus transmits the beacon, the first master wireless communication apparatus transmits the echo beacon, wherein a flame configuration of the beacon comprises:
terminal information about a terminal configuring a sub-piconet with the second master wireless communication apparatus; and
terminal information about a terminal configuring a sub-piconet with the third master wireless communication apparatus.

16. A master wireless communication apparatus that performs wireless communication using a directional radio wave, the master wireless communication apparatus comprising:
- a medium access control (MAC) processor that, using one subsuperframe acquired by dividing a superframe used in a network communication, into subsuperframes in a time domain, generates a first main beacon that is a reference signal for synchronization and for transmission to another master wireless communication apparatus arranged such that directivities of the master wireless communication apparatus and the other master wireless communication apparatus face each other, wherein the first main beacon includes (i) a header including a transmission source address, (ii) information including a flag that indicates no echo, and (iii) peripheral equipment control information;
- a transmitter that transmits the generated first main beacon; and
- a receiver that receives, from the other master wireless communication apparatus, a second main beacon that is the reference signal for synchronization and for transmission using another subsuperframe acquired by dividing the superframe used in the network communication, into the subsuperframes in the time domain, wherein:
- the MAC processor further generates an echo beacon including information showing that the beacon is an echo of the second main beacon;
- the MAC processor changes, in the second main beacon, the transmission source address, and the flag to a flag that indicates echo, without changing the peripheral equipment control information, to generate the echo beacon; and
- the transmitter further transmits the generated echo beacon, to a slave wireless communication apparatus in a communication area of the master wireless communication apparatus and out of a communication area of the other master wireless communication apparatus, wherein
- the directional radio wave is a radio wave in a millimeter wave band having a strong directivity.

17. The master wireless communication apparatus according to claim 16, wherein a frame configuration of the beacon comprises terminal information about a terminal configuring a sub-piconet with further master wireless communication apparatuses.

18. The master wireless communication apparatus according to claim 16, wherein the master wireless communication apparatus controls at least one slave wireless communication apparatus that copies a received signal resulting from a request for assignment of a communication period, and retransmits the copied signal.

* * * * *